(12) United States Patent
Mizutani et al.

(10) Patent No.: US 7,034,525 B2
(45) Date of Patent: Apr. 25, 2006

(54) ROTATIONAL ANGLE DETECTING DEVICE

(75) Inventors: Akitoshi Mizutani, Okazaki (JP); Takao Ban, Toyohashi (JP)

(73) Assignee: Denso Corporation, (JP)

( * ) Notice: Subject to any disclaimer, the term of this patent is extended or adjusted under 35 U.S.C. 154(b) by 0 days.

(21) Appl. No.: 10/861,449

(22) Filed: Jun. 7, 2004

(65) Prior Publication Data
US 2004/0251896 A1    Dec. 16, 2004

(30) Foreign Application Priority Data
Jun. 13, 2003 (JP) .............................. 2003-169199

(51) Int. Cl.
*G01B 7/30* (2006.01)
(52) U.S. Cl. .............................. 324/207.25; 324/207.24
(58) Field of Classification Search .......... 324/207.25, 324/207.2, 207.21, 207.12, 251, 252, 207.24; 338/32 R, 32 H
See application file for complete search history.

(56) References Cited

U.S. PATENT DOCUMENTS

| | | | | |
|---|---|---|---|---|
| 4,893,502 A | * | 1/1990 | Kubota et al. ............. | 73/118.1 |
| 6,356,073 B1 | * | 3/2002 | Hamaoka et al. .......... | 324/207.2 |
| 6,489,761 B1 | * | 12/2002 | Schroeder et al. ..... | 324/207.25 |
| 6,753,681 B1 | * | 6/2004 | Enomoto et al. ...... | 324/207.25 |
| 2004/0061495 A1 | * | 4/2004 | Shimomura et al. ... | 324/207.25 |

FOREIGN PATENT DOCUMENTS

| | | |
|---|---|---|
| JP | 64-37607 | 2/1989 |
| JP | 2-122205 | 5/1990 |
| JP | 2-298815 | 12/1990 |

* cited by examiner

Primary Examiner—Bot Ledynh
Assistant Examiner—Reena Aurora
(74) Attorney, Agent, or Firm—Nixon & Vanderhye PC

(57) ABSTRACT

In a rotational angle detecting device, an auxiliary magnet is disposed so as to surround a Hall element around the Z-axis, so that variation of offset magnetic flux is suppressed even when the position of the Hall element is displaced in the X-axis direction with respect to the auxiliary magnet. In addition, even when the fabrication position of the Hall element is displaced in the Y-axis direction of the auxiliary magnet, the variation of the offset magnetic flux is suppressed. By adjusting the dimension (the length in cylinder direction) in the Z-axis direction of the auxiliary magnet, the variation of the offset magnetic flux is suppressed even when the Hall element is displaced from the center of the auxiliary magnet in the Z-axis direction. That is, even when the position of the Hall element is displaced from the center of the auxiliary magnet in the three-dimensional direction, the displacement of the offset magnetic flux can be prevented, and thus reduction of the detection precision can be prevented.

16 Claims, 18 Drawing Sheets

FIG. 1A
FIG. 1B
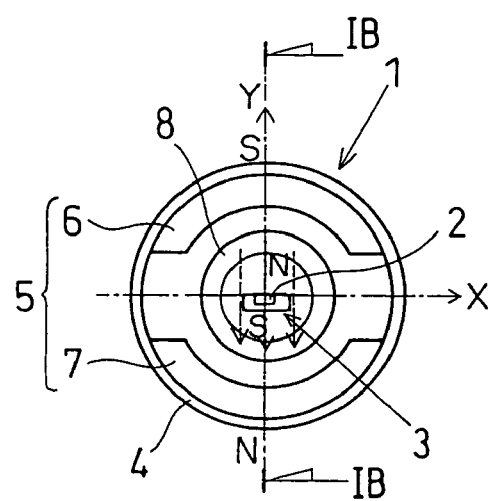
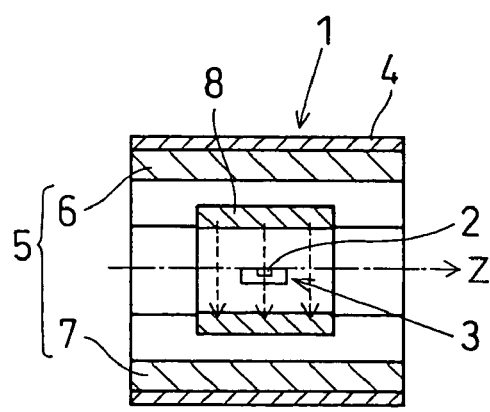

FIG. 14
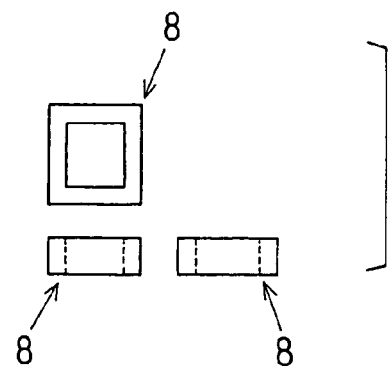
FIG. 15A    FIG. 15B
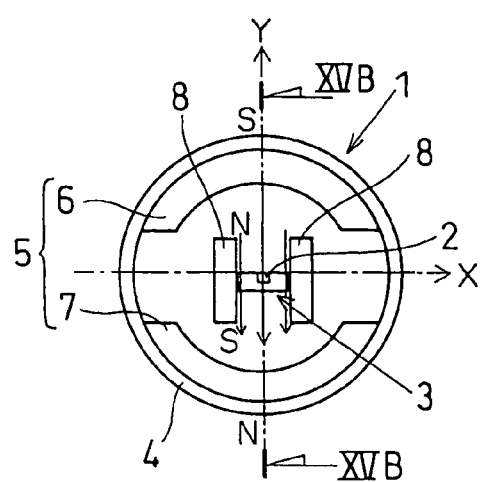
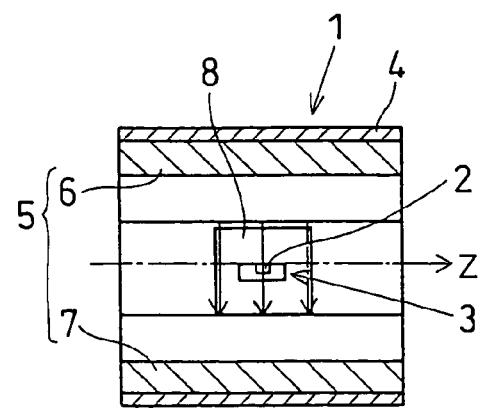

ROTATIONAL ANGLE DETECTING DEVICE

CROSS REFERENCE TO RELATED APPLICATION

This application is based upon, claims the benefit of priority of, and incorporates by reference the contents of Japanese Patent Application No. 2003-169199 filed on Jun. 13, 2003.

FIELD OF THE INVENTION

The present invention relates to a rotational angle detecting device for detecting the relative rotational angle of two members such as a rotating member and a non-rotating member.

BACKGROUND OF THE INVENTION

The structure of a related art rotational angle detecting device will be briefly described with reference to FIGS. 27A–27B. The rotational angle detecting device comprises a rotor J2 formed of magnetic material which has magnet (hereinafter referred to as "main magnet J1") divided in a radial direction so as to form a substantially cylindrical shape with a magnetic pole facing in one direction, and a magnetic detection element J3 (for example, Hall IC) fixedly disposed in the rotor J2. The main magnet J1 has magnetic poles confronting in the same direction. When the relative rotational angle between the main magnet J1 and the magnetic detection element J3 is varied, the magnetic flux density (magnetic force) passing through the magnetic detection element J3 is varied, so that the output signal of the magnetic detection element J3 is varied. That is, the rotational angle detecting device detects the relative rotational angle of the member at the main magnet J1 side and the member at the magnetic detection element J3 side on the basis of the output signal of the magnetic detection element J3.

FIG. 2A shows the typical relationship between the rotational angle and the magnetic flux density passing through the magnetic detection element J3 (the magnetic flux density passing through the magnetic detection element J3 will be hereinafter merely referred to as "magnetic flux density") in the rotational angle detecting device having the above structure. It is assumed that the output range of the magnetic detection element J3 in connection with the magnetic flux density variation when the main magnet J1 is clockwise rotated around the magnetic detection element J3 in FIG. 27A is set to a positive side while the output range of the magnetic detection element J3 in connection with the magnetic flux density variation when the main magnet J1 is counterclockwise rotated around the magnetic detection element J3 in FIG. 27A is set to a negative side. In this case, when the use output range of the magnetic detection element J3 is used at any one of the positive and negative sides, the magnetic density is turned back at ±90 degrees, and thus the detection limit is in the range of ±90 degrees.

In general, a permanent magnet is used as the main magnet J1. The permanent magnet has a temperature characteristic that the magnetic flux varies with the temperature. However, the variation of the temperature characteristic is a minimum when the magnetic flux density is equal to 0 (mT, the unit is hereinafter omitted). Therefore, the magnetic detection precision at the magnetic flux density around 0 is enhanced.

Here, when the rotational angle detecting device is applied to a means for detecting the opening degree of a throttle valve, it is required to detect a minute opening degree around the opening degree under idling with high precision, and thus the magnetic density around 0 is required to be used as the 0° position of the throttle valve.

In this case, the detection range of the throttle valve is limited to the range from 0° to 90°, and thus an opening degree of 90° or more cannot be detected.

That is, the detection of 90° or more is impossible not only in the case where the conventional rotational angle detecting device is applied to the throttle vale, but also in the case where the reference angle of the angle 0° is set around the magnetic flux density of 0, and thus the detection angle range is limited to the range from 0° to 90°.

Furthermore, in order to enhance the detection precision, it is required that the variation characteristic of the magnetic flux density in the detection angle range has linearity (hereinafter referred to as "linearity"). However, the output of the magnetic detection element J3 has a sine-curve variation, so that the detection range having high linearity is narrow and the linearity would be lowered as shown in FIG. 2A if the detection range is broadened.

As a means of solving the above disadvantage has been proposed a technique, as shown in FIGS. 28A–28B, that an auxiliary magnet J4 is disposed in the neighborhood of the magnetic detection element J3, and the detection angle range is enlarged to 90° or more or the detection range having high linearity is broadened by applying constant magnetic force in the magnetic detection direction of the magnetic detection element J3 while the reference angle of the angle 0° is set in the neighborhood of the magnetic flux density of 0 at which the magnetic flux density is not varied by the temperature characteristic (non prior art: for example, JP Application 2002-285378).

In the technique disclosed in JP Application 2002-285378, as shown at the lower side of FIG. 29, when the auxiliary magnet J4 is merely disposed in the neighborhood of the magnetic detection element J3 to apply constant magnetic force in the magnetic detection direction of the magnetic detection element J3, variation of the distance between the auxiliary magnet J4 and the magnetic detection element J3 (represented by the distance in the X-axis direction in FIG. 29) greatly varies the magnetic flux density detected by the magnetic detection element J3 as shown in the graph at the upper side of FIG. 29 because the auxiliary magnet J4 forms an open magnetic path. Accordingly, the rotational angle of the main magnet J1 for the magnetic flux density of 0 is varied after the offset based on the auxiliary magnet J4, so that the detection precision is lowered.

Furthermore, in the case of use of a stator yoke J5 which is not varied in relative rotational angle with respect to the magnetic detection element J3 and effectively leads magnetic flux occurring in the main magnet J1 to the magnetic detection element J3 as shown in FIG. 30, the auxiliary magnet J4 forms a closed magnetic path, and thus the effect of the displacement of the relative distance between the magnetic detection element J3 and the auxiliary magnet 14 can be suppressed to a small level. However, the use of the stator yoke J5 increases the number of parts. Furthermore, hysteresis occurs in the magnetic flux density applied to the magnetic detection element J3 due to the residual magnetic flux of the stator yoke J5, so that the detection precision is deteriorated.

SUMMARY OF THE INVENTION

The rotational angle detecting device of this invention is applied to a technique that the value of magnetic flux density applied to a magnetic detection element by a main magnet is changed (offset) to a different value by auxiliary magnet, and has an object to provide a rotational angle detecting device in which a yoke which is not varied in relative rotational angle with respect to the magnetic detection element (when the magnetic detection element is a non-rotating member, the yoke is a stator yoke, and when the magnetic detection element is a rotating member, the yoke is a rotor yoke) is eliminated, so that the detection precision can be prevented from being lowered by the effect of the residual magnetic flux of the yoke and also the offset value based on the auxiliary magnet (the variation amount of the magnetic flux density applied to the magnetic detection element) can be prevented from being varied even when the displacement occurs in the relative distance between the magnetic detection element and the auxiliary magnet due to fabrication error or the like.

According to a rotational angle detecting device according to a first aspect of the present invention, an auxiliary magnet disposed so as to surround a magnetic detection element applies constant magnetic force in the magnetic detection direction of the magnetic detection element, whereby a main magnet angle at which the magnetic density flux is set to 0 by a main magnet can be offset to another angle by the auxiliary magnet.

That is, the main magnet angle for the magnetic flux density of 0 under which the magnetic flux density is not varied by the temperature characteristic can be set to any value (offset amount setting).

By the offset amount setting, the main magnet angle for the magnetic flux density of 0 at which the magnetic flux density is not varied by the temperature characteristic can be moved from an angle for the magnetic flux density of 0 before the offset and set to a reference angle (angle 0°). Therefore, the detection angle range can be enlarged to 90° or more.

The reference angle at which the magnetic flux density is set to 0 by the main magnet is offset to another angle by the auxiliary magnet, whereby the rotational angle can be detected by using a high-linearity portion of the output of the magnetic detection element as much as possible. That is, the high-linearity detection range can be broadened, and thus the broad detection range can be detected with high precision.

In the rotational angle detecting device of the first aspect of present invention, the auxiliary magnet is disposed so as to surround the magnetic detection element. Accordingly, the surrounding of the magnetic detection element becomes an overall enveloping magnetic gap. Therefore, even when the relative distance between the magnetic detection element and the auxiliary magnet is displaced inside the auxiliary magnet surrounding the magnetic detection element, the variation of the magnetic flux density applied to the magnetic detection element by the auxiliary magnet is suppressed, and the variation of the offset amount by the auxiliary magnet can be suppressed.

That is, even when the relative distance between the magnetic detection element and the auxiliary magnet is displaced inside the auxiliary magnet surrounding the magnetic detection element, the main magnet angle (reference angle) for the magnetic density of 0 can be prevented from being deviated, and thus the detection precision can be prevented from being lowered.

Furthermore, the rotational angle detecting device of the first aspect of the present invention does not use any yoke which is not varied in relative rotational angle with respect to the magnetic detection element and effectively leads the magnetic flux occurring in the main magnet to the magnetic detection element (a stator yoke when the magnetic detection element is a non-rotating member, and a rotor yoke when the magnetic detection element is a rotating member). Since no yoke is used, the number of parts can be reduced.

Furthermore, since there is not used any yoke which is not varied in relative rotational angle with respect to the magnetic detection element, there does not occur any effect of the residual magnetic flux of the yoke. That is, there does not occur any hysteresis of the magnetic flux density applied to the magnetic detection element by the residual magnetic flux of the yoke, and thus the detection precision can be prevented from being lowered.

According to a rotational angle detecting device of a second aspect, an auxiliary magnet disposed at both the sides of a magnetic detection element applies constant magnetic force in the magnetic detection direction of the magnetic detection element, whereby a main magnet angle at which the magnetic flux density is set to 0 by a main magnet can be offset to another angle by the auxiliary magnet.

That is, like the first aspect, the main magnet angle for the magnetic flux density of 0 at which the magnetic flux density is not varied by the temperature characteristic can be set to any value (offset amount setting).

By the offset amount setting, the main magnet angle for the magnetic flux density of 0 at which the magnetic flux density is not varied by the temperature characteristic can be moved from an angle for the magnetic flux density of 0 before the offset and set to a reference angle (angle 0°). Therefore, the detection angle range can be enlarged to 90° or more.

Furthermore, the main magnet angle (reference angle) at which the magnetic flux density is set to 0 by the main magnet is offset to another angle by the auxiliary magnet, so that the rotational angle can be detected by using a high-linearity portion of the output portion of the magnetic detection element as much as possible. That is, the high-linearity detection range can be broadened, and the broad detection range can be detected with high precision.

According to the rotational angle detecting device of the second aspect, the auxiliary magnet is disposed at both the sides of the magnetic detection element.

Therefore, even when the relative distance between the magnetic detection element and the auxiliary magnet is displaced in the direction along which the magnetic detection element is sandwiched by the auxiliary magnet (to one side or other side of the auxiliary magnet), the variation of the magnetic flux density applied to the magnetic detection element by the auxiliary magnet can be suppressed, and the variation of the offset amount by the auxiliary magnet can be suppressed.

That is, even when the relative distance between the magnetic detection element and the auxiliary magnet is displaced in the direction along which the magnetic detection element is sandwiched by the auxiliary magnet, the main magnet angle (reference angle) for the magnetic flux density of 0 can be prevented from being displaced, and thus the detection precision can be prevented from being lowered.

Furthermore, according to the rotational angle detecting device of the second aspect, like the first aspect, there is not used any yoke which is not varied in relative rotational angle with respect to the magnetic detection element and effectively leads the magnetic flux occurring in the main magnet to the magnetic detection element. Non-use of the yoke makes it possible to reduce the number of parts.

Since there is not used any yoke which is not varied in relative rotational angle with respect to the magnetic detection element, there does not occur any effect of the residual magnetic flux of the yoke. That is, there does not occur any hysteresis of the magnetic flux density applied to the magnetic detection element by the residual magnetic flux of the yoke, and thus the detection precision can be prevented from being lowered.

According to a rotational angle detecting device of a third aspect, the magnetic flux direction of the magnetic flux applied to the magnetic detection element by the auxiliary magnet and the magnetic detection direction of the magnetic detection element are not parallel to each other, and they have an offset angle.

The magnetic flux density detected by the magnetic detection element can be adjusted by providing an offset angle between the magnetic flux direction of the magnetic flux applied from the auxiliary magnet to the magnetic detection element and the magnetic detection direction of the magnetic detection element and adjusting the offset angle. That is, by adjusting the offset angle, the main magnet angle (reference angle) for the magnetic flux density of 0 can be adjusted to any value.

According to a rotational angle detecting device of a fourth aspect, the main magnet and the auxiliary magnet of the rotational angle detecting device are formed of permanent magnets having the same temperature characteristic. With this construction, there can be avoided the disadvantage that the main magnet angle (reference angle) for the magnetic flux density of 0 is varied due to temperature variation.

BRIEF DESCRIPTION OF THE DRAWINGS

The above and other objects, features and advantages of the present invention will become more apparent from the following detailed description made with reference to the accompanying drawings. In the drawings:

FIG. 1A is a diagram showing a rotational angle detecting device of a first embodiment when viewed along the Z-axis direction, and FIG. 1B is a cross-sectional view of the rotational angle detecting device of the first embodiment which is taken along the Z-axis direction (line IB—IB);

FIG. 14 is a three-plan view of the auxiliary magnet in the eighth embodiment;

FIG. 15A is a diagram showing a rotational angle detecting device of a ninth embodiment when viewed along the Z-axis direction, and FIG. 15B is a cross-sectional view of the rotational angle detecting device of the ninth embodiment which is taken along the Z-axis direction (line XVB—XVB);

DETAILED DESCRIPTION OF THE PREFERRED EMBODIMENTS

Figure 2A:
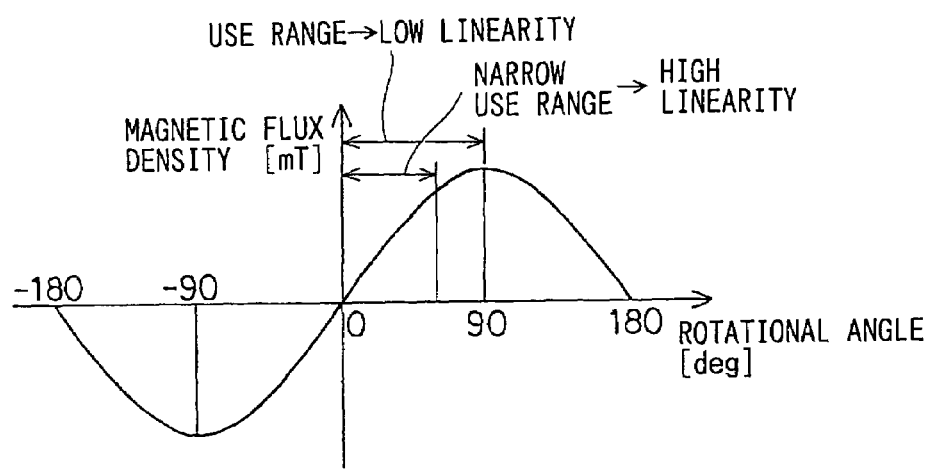
FIGS. 2A and 2B are graphs showing the relationship between the magnetic flux density and the rotational angle in the rotational angle detecting device according to the first embodiment.

Preferred embodiments according to the present invention will be described hereunder with reference to the embodiments and modifications. In the following description, first to eighth embodiments are associated with the first aspect of the present invention, and ninth to thirteenth embodiments are associated with the second aspect of the present invention. Furthermore, fourteenth to seventeenth embodiments correspond to modifications common to the first and second aspects of the present invention.

[First Embodiment]

A first embodiment according to the present invention will be described with reference to FIGS. 1A to 3.

First, the basic construction of a rotational angle detecting device will be described with reference to FIGS. 1A and 1B. FIG. 1A is a diagram showing the rotational angle detecting device when viewed from the rotational axis direction, and FIG. 1B is a cross-sectional view of the rotational angle detecting device which is taken along the rotational axis direction.

The rotational angle detecting device of this embodiment aims to detect the rotational angle (opening degree) of a throttle valve, for example. It is equipped with a rotor 1 (rotating member) which rotates integrally with the throttle valve through a member (not shown), and a Hall IC 3 containing a Hall element 2 (such as, for example, a magnetic detection element). The Hall IC 3 is supported by a fixing member (non-rotating member) (not shown), and the Hall element 2 is disposed on the rotational axis of the rotor 1.

The rotor 1 is disposed coaxially around the Hall IC 3, strictly around the Hall element 2, and it comprises a cylindrically-shaped magnet support cylinder 4, and a main magnet 5 for applying magnetic force to the Hall element 2.

The main magnet 5 comprises a magnetic flux applying magnet 6 for applying magnetic flux to the Hall element 2, and a magnetic flux attraction magnet 7 for sucking magnetic flux applied from the magnetic flux applying magnet 6 to the Hall element 2. That is, the main magnet 5 is disposed so that the inner peripheral surface of the magnetic flux applying magnet 6 has N-pole polarity and the inner peripheral surface of the magnetic flux suction magnet 7 has an S-pole polarity.

The magnetic flux applying magnet 6 and the magnetic suction magnet 7 are disposed at both the sides of the Hall element 2 so as to be spaced from each other and to confront each other. Each of the magnetic flux applying magnet 6 and the magnet flux suction magnet 7 of this embodiment is designed to have a semi-cylindrical shape, and thus the main magnet has a substantially cylindrical shape which is divided into the magnetic flux applying magnet 6 and the magnetic flux suction magnet 7 in the radial direction. A predetermined air gap is formed at each confronting portion at which the ends of the respective sectionally-arcuate portions of the magnetic flux applying magnet 6 and the magnetic flux suction magnet 7 are confronted to each other. The magnetic flux applying magnet 6 and the magnetic flux suction magnet 7 are fixed in the magnet support cylinder 4 and disposed so as to surround the Hall element 2.

The thickness of at least one of the magnetic flux applying magnet 6 and the magnetic flux suction magnet 7 may be varied so that the magnetic flux density applied to the Hall element 2 by the main magnet 5 is prevented from being varied even when the mount position of the Hall element 2 is displaced.

The Hall IC 3 disposed at the center of the rotor 1 is preferably a well-known IC achieved by integrating the Hall element 2, a signal processing circuit, etc., and outputs the voltage signal corresponding to the magnetic flux density in the direction (magnetic detection direction) perpendicular to the magnetic detection face of the Hall element 2.

The operation of the rotational angle detecting device thus constructed (the construction having no auxiliary magnet 8 described above) will be described with reference to FIG. 2A.

In the following description, as shown in FIG. 1, the rotational axis of the rotor 1 is set to the Z axis, the magnetic non-sensitive direction of the Hall element 2 (the direction along the magnetic detection face) which is perpendicular to the Z axis is set to the X axis, and the magnetic detection direction of the Hall element 2 (the direction perpendicular to the magnetic detection face) which is perpendicular to the Z axis is set to the Y axis.

Here, the rotational angle of the rotor 1 when the center axis of the air gap between the magnetic flux applying magnet 6 and the magnetic flux suction magnet 7 is oriented in the Y-axis direction is set to 0°, and the rotational angle of the rotor 1 when the center axis of the air gap between the magnetic flux applying magnet 6 and the magnetic flux suction magnet 7 is oriented in the X-axis direction is set to 90° (see FIGS. 1A and 1B).

The rotational angle detecting device is equipped with a magnetic circuit in which magnetic flux flows through a route extending from the magnetic flux applying magnet 6 through the Hall IC 3 (Hall element 2) to the magnetic flux suction magnet 7. When the rotor 1 is rotated together with the throttle valve, the magnetic flux density perpendicular to the magnetic detection face of the Hall element 2 is varied.

More particularly, as shown in FIG. 2A, the magnetic flux density perpendicular to the magnetic detection face of the Hall element 2 is maximum when the rotational angle of the rotor 1 is equal to 90°, and the magnetic flux density perpendicular to the magnetic detection face of the Hall element 2 is reduced in accordance with the rotational angle when the rotational angle of the rotor 1 is increased to an angle more than 90° or reduced to an angle less than 90°. The magnetic flux perpendicular to the magnetic detection face of the Hall element 2 is equal to 0 at the position where the rotational angle of the rotor 1 is equal to 0°.

Furthermore, when the rotational angle of the rotor 1 is rotated to a minus side from 0°, the magnetic density in the opposite direction which is perpendicular to the magnetic detection face of the Hall element 2 is increased in accordance with the rotational angle. When the rotational angle of the rotor 1 is equal to −90°, the magnetic density in the opposite direction which is perpendicular to the magnetic detection face of the Hall element 2 is maximum.

When the rotational angle of the rotor 1 is further rotated to the minus side from −90°, the magnetic flux amount in the opposite direction which is perpendicular to the magnetic detection face is reduced in accordance with the rotational angle, and the magnetic flux density in the opposite direction which passes through the Hall element 2 is reduced.

(First Feature of First Embodiment)

As mentioned above in the background, it is a requirement for the rotational angle detecting device to detect the opening degree of the throttle valve that a position around the magnetic density of 0 is used as the 0° position of the throttle valve because the minute opening degree (in the neighborhood of idling) is required to be detected with high precision.

Accordingly, the detection range of the rotational angle detecting device is limited to the range from 0° to 90°, and thus 90° or more cannot be detected by the rotational angle detection device.

Therefore, the rotational angle detecting device of this embodiment is equipped with an auxiliary magnet 8 whose relative rotational angle is not varied with respect to the Hall IC 3 at all times and which offsets the magnetic flux density to be detected by the Hall IC3 by applying constant magnetic flux density to the Hall IC3.

The auxiliary magnet 8 of this embodiment is disposed so as to surround the Hall IC3 (Hall element 2) when viewed in the Z axis direction. Specifically, the auxiliary magnet 8 of this embodiment is designed in a cylindrical shape so as to surround the Hall IC 3 (Hall element 2) as shown in FIG. 1A, and it is secured to a fixing member (not show) so that the Hall element 2 is located at the center of the auxiliary magnet 8 having the cylindrical shape.

The auxiliary magnet 8 of this embodiment is magnetized so that the magnetic pole is oriented in the magnetic detection direction (the direction perpendicular to the magnetic detection face).

Furthermore, the auxiliary magnet 8 of this embodiment is equipped to increase the magnetic flux density to be applied to the Hall element 2. Specifically, the auxiliary magnet 8 is magnetized so that the upper inner peripheral surface thereof is set to an N-pole and the lower inner peripheral surface thereof is set to an S-pole as shown in FIG. 1A, and the output of the Hall IC3 generates a plus output (addition output) by the effect of the magnetic flux applied from the auxiliary magnet 8 to the Hall element 2 even when the magnetic flux density applied to the Hall element 2 by only the main magnet 5 is equal to zero (the state of FIG. 1). The magnetic flux density applied to the Hall element 2 by the auxiliary magnet 8 is set to be smaller than the maximum magnetic flux density applied to the Hall element 2 by the main magnet 5.

Figure 2B:
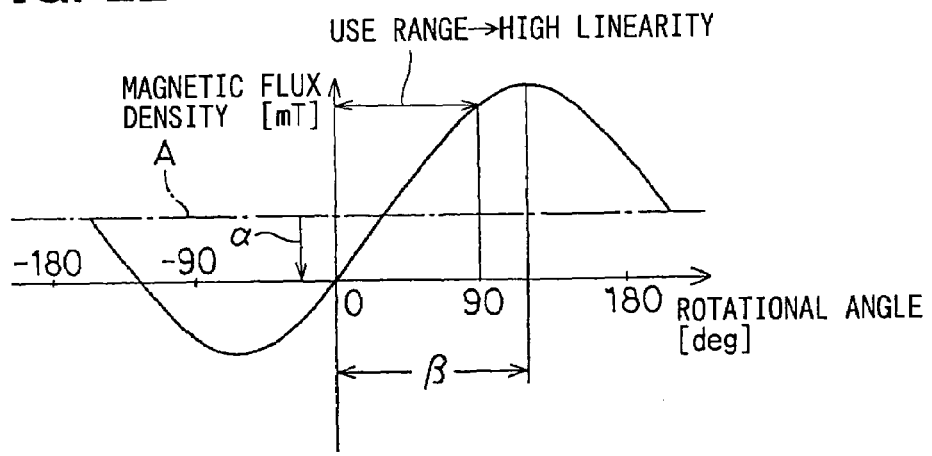

Accordingly, the main magnet angle at which the magnetic flux density is equal to zero can be varied by the auxiliary magnet 8 as shown in FIG. 2B. Specifically, in FIG. 2B, a line indicated by a chain line A shows the relationship between the rotational angle and the magnetic flux density when only the main magnet 5 is provided and the auxiliary magnet 8 is not provided. However, by disposing the auxiliary magnet 8, the main magnet angle at which the magnetic flux density is equal to zero can be offset by the angle corresponding to the magnetic flux density α indicated by an arrow.

The main magnet 5 (the magnetic flux applying magnet 6 and the magnetic flux suction magnet 7) and the auxiliary magnet 8 are formed of permanent magnets having the same temperature characteristic. That is, the main magnet 5 and the auxiliary magnet 8 comprise permanent magnets formed of the same material (for example, rare earth magnet, ferrite magnet, alnico magnet, magnetized ferrite-resin magnet or the like). Therefore, this embodiment can avoid the disadvantage that the angle at which the magnetic flux density is equal to zero is varied by the temperature variation.

(First Effect)

According to the rotational angle detecting device of this embodiment, the vicinity of 0° of the throttle valve around which the detection precision is most needed in the throttle valve is set to the vicinity of the magnetic flux density of 0 around which the magnetic flux density is not varied by the temperature characteristic, and the detection angle range β can be enlarged to 90° or more. Therefore, the opening degree of the throttle valve having the throttle opening degree of 90° or more can be detected by the rotational angle detecting device.

Furthermore, the rotational angle can be detected by using a high-linearity portion in the output of the Hall IC3 as much as possible. That is, the high-linearity detection range can be broadened, and the detection precision can be enhanced.

(Second Feature of First Embodiment)

Figure 3A:
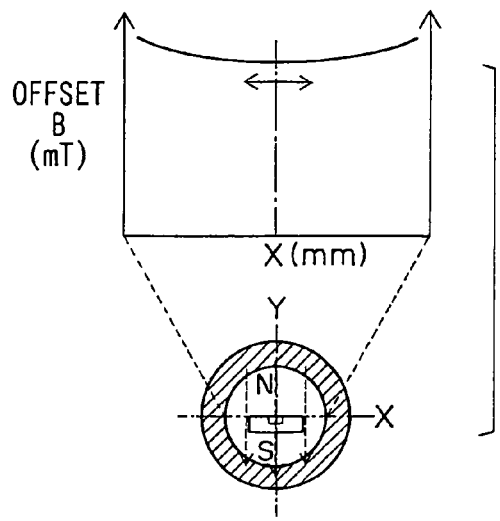
FIGS. 3A to 3C are graphs showing the relationship between the displacement amount of a Hall element and an offset magnetic flux in the first embodiment.

Since the cylindrical auxiliary magnet 8 is disposed so as to surround the Hall element 2 in the Z axis direction, the variation of the magnetic flux density (offset magnetic flux) applied to the Hall element 2 by the auxiliary magnet 8 is suppressed as shown in FIG. 3A even when the position of the Hall element 2 is displaced in the X-axis direction with respect to the auxiliary magnet 8. That is, the main magnet angle (reference angle) for the magnetic flux density of 0 can be prevented from being displaced, and thus reduction of the detection precision can be prevented.

Figure 3B:
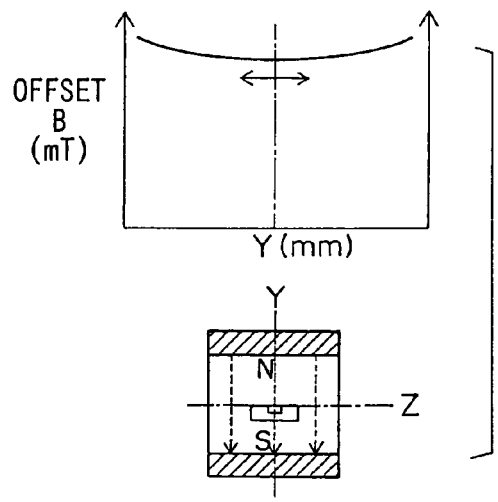

Likewise, since the cylindrical auxiliary magnet 8 is disposed so as to surround the Hall element 2 in the Z axis direction, the variation of the magnetic flux density (offset magnetic flux) applied to the Hall element 2 by the auxiliary magnet 8 is suppressed as shown in FIG. 3B even when the fabrication position of the Hall element 2 is displaced in the Y-axis direction with respect to the auxiliary magnet 8. That is, the main magnet angle (reference angle) for the magnetic flux density of 0 can be prevented from being displaced, and thus reduction of the detection precision can be prevented.

As described above, even when the Hall element 2 is displaced from the center of the auxiliary magnet 8 around the Z-axis (the two-dimensional direction of the X axis and Y axis), the main magnet angle (reference angle) for the magnetic flux density of 0 can be prevented from being displaced by disposing the auxiliary magnet 8 so as to surround the Hall element 2 when viewed in the Z-axis direction, so that the reduction of the detection precision can be prevented.

On the other hand, leak magnetic flux is magnified at both the end sides of the cylindrical auxiliary magnet 8 in the Z-axis direction.

Figure 3C:
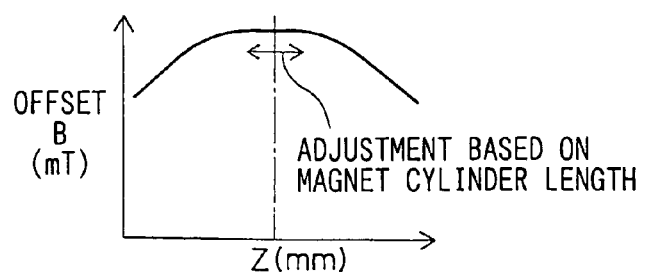

Therefore, by lengthening the dimension in the Z-axis direction of the auxiliary magnet 8 (the length in the cylinder direction), a long Z-axis area which suffers no effect of the leak magnetic flux can be achieved as shown in FIG. 3C. That is, by adjusting the dimension in the Z-axis direction of the auxiliary magnet 8 (the length in the cylinder direction), the variation of the magnetic flux density (offset magnetic flux) applied to the Hall element 2 by the auxiliary magnet 8 can be suppressed even when the Hall element 2 is displaced in the Z-axis direction from the center of the auxiliary magnet 8, and thus the reduction of the detection precision can be prevented.

(Second Effect)

According to the rotational angle detecting device of this embodiment, the Hall element 2 is surrounded by the auxiliary magnet 8 when viewed in the Z-axis direction and the dimension in the Z-axis direction of the auxiliary magnet 8 (the length in the cylinder direction) is adjusted as described above, whereby the main magnet angle (reference angle) for the magnetic flux density of 0 can be prevented from being displaced even when the position of the Hall element 2 is displaced in a three-dimensional direction (the three-dimensional direction based on X-axis, Y-axis, Z-axis) from the center of the auxiliary magnet 8, and thus the reduction of the detection precision can be prevented.

(Third Feature and Effect of First Embodiment)

Figure 30:
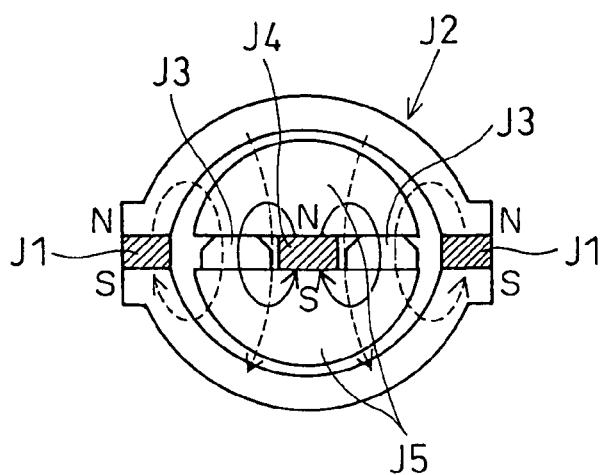
FIG. 30 is a diagram showing the rotational angle detecting element of the related art when viewed along the Z-axis direction.

The rotational angle detecting device of this embodiment can achieve the effects of the second embodiment described above without using the stator yoke J5 of FIG. 30 described above in the background. If the stator yoke is used, however, the number of parts is increased. Furthermore, hysteresis occurs in the magnetic flux density applied to the Hall element 2 by the residual magnetic flux of the stator yoke, and thus the detection precision is lowered.

According to this embodiment, no stator yoke is used, and thus the number of parts can be reduced, so that the cost of the rotational angle detecting device can be suppressed.

Furthermore, since no stator yoke is used, there occurs no effect of the residual magnetic flux of the stator yoke. That is, no hysteresis occurs in the magnetic flux density applied to the Hall element 2 by the residual magnetic flux density of the stator yoke, and thus the deterioration of the detection precision due to use of the stator yoke can be prevented.

[Second Embodiment]

Figure 4A:
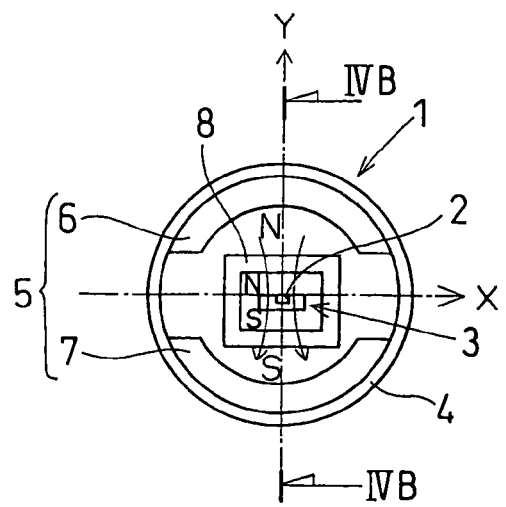
FIG. 4A is a diagram showing a rotational angle detecting device of a second embodiment when viewed along the Z-axis direction.
Figure 4B:
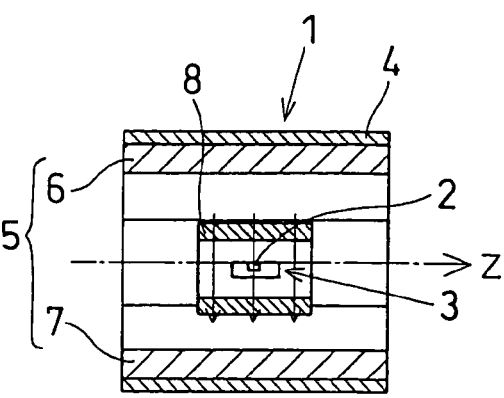
FIG. 4B is a cross-sectional view of the rotational angle detecting device of the second embodiment which is taken along the Z-axis direction (line IVB—IVB)

A second embodiment of the present invention will be described with reference to FIGS. 4A and 4B. FIG. 4A is a diagram showing a rotational angle detecting device when viewed in the Z-axis direction, and FIG. 4B is a cross-sectional view of the rotational angle detecting device which is taken along the Z-axis direction. In the second and subsequent embodiments, the same reference numerals as the first embodiment represent the elements having the same functions unless otherwise specified.

In the first embodiment, the auxiliary magnet 8 is designed in a cylindrical shape. However, in the second embodiment, the auxiliary magnet 8 is designed in a cylindrical shape having a rectangular section. Even when such a construction is adopted, the same action and effect as the first embodiment can be achieved.

[Third Embodiment]

Figure 5A:
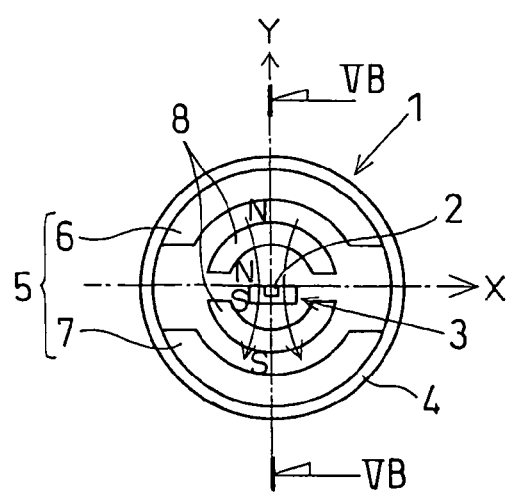
FIG. 5A is a diagram showing a rotational angle detecting device of a third embodiment when viewed along the Z-axis direction.
Figure 5B:
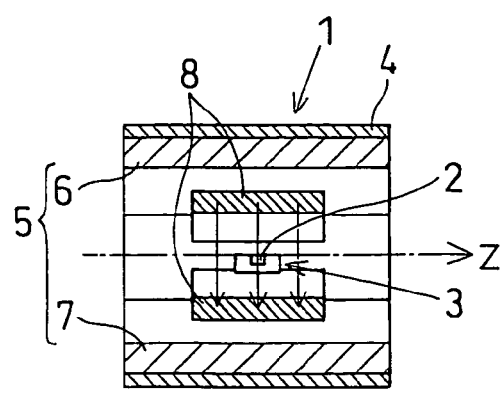
FIG. 5B is a cross-sectional view of the rotational angle detecting device of the third embodiment which is taken along the Z-axis direction (line VB—VB)

A third embodiment of the present invention will be described with reference to FIGS. 5A and 5B. FIG. 5A is a diagram showing a rotational angle detecting device when viewed in the Z-axis direction, and FIG. 5B is a cross-sectional view of the rotational angle detecting device which is taken along the Z-axis direction.

In the first embodiment, the Hall IC3 (Hall element 2) is surrounded by one cylindrical auxiliary magnet 8. However, in the third embodiment, the Hall IC3 (Hall element 2) is surrounded by two semi-cylindrical auxiliary magnets 8 which are combined with each other. Even when such a construction is adopted, the same action and effect as the first embodiment can be achieved.

[Fourth Embodiment]

Figure 6A:
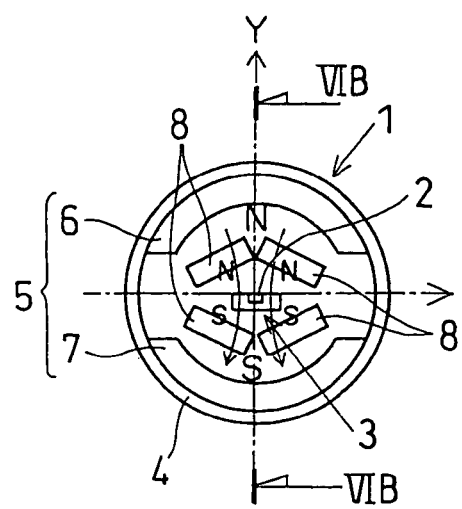
FIG. 6A is a diagram showing a rotational angle detecting device of a fourth embodiment when viewed along the Z-axis direction.
Figure 6B:
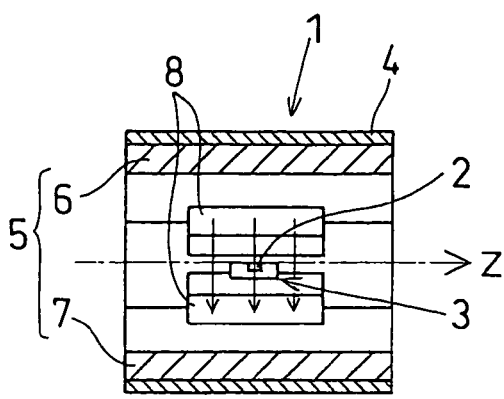
FIG. 6B is a cross-sectional view of the rotational angle detecting device of the fourth embodiment which is taken along the Z-axis direction (line VIB—VIB)

A fourth embodiment of the present invention will be described with reference to FIGS. 6A and 6B. FIG. 6A is a diagram showing a rotational angle detecting device when viewed in the Z-axis direction, and FIG. 6B is a cross-sectional view of the rotational angle detecting device which is taken along the Z-axis direction.

In this embodiment, the Hall IC 3 (Hall element 2) is surrounded by plural (four in this embodiment) auxiliary magnets 8 each having a planar shape. Even when such a construction is adopted, the same action and effect as the first embodiment can be achieved.

[Fifth Embodiment]

Figure 7A:
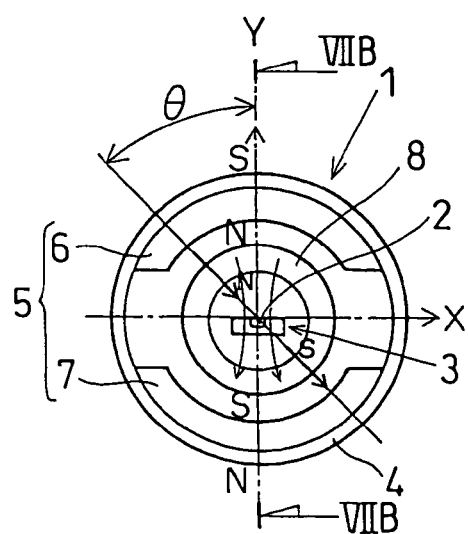
FIG. 7A is a diagram showing a rotational angle detecting device of a fifth embodiment when viewed along the Z-axis direction.
Figure 7B:
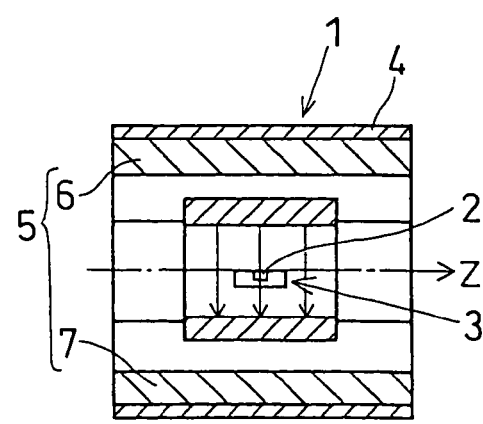
FIG. 7B is a cross-sectional view of the rotational angle detecting device of the fifth embodiment which is taken along the Z-axis direction (line VIIB—VIIB)

A fifth embodiment of the present invention will be described with reference to FIGS. 7A and 7B and FIG. 8. FIG. 7A is a diagram showing a rotational angle detecting device when viewed in the Z-axis direction, and FIG. 7B is a cross-sectional view of the rotational angle detecting device which is taken along the Z-axis direction.

In the first to fourth embodiments, the auxiliary magnet 8 is magnetized so that the magnetic flux is directed in the magnetic detection direction (the direction perpendicular to the magnetic detection face).

In the fifth embodiment, the magnetization direction of the auxiliary magnet 8 has an offset angle θ with respect to the magnetic detection direction of the Hall element 2. That is, the magnetic flux direction along which the auxiliary magnet 8 applies the magnetic flux to the Hall element 2 and the magnetic detection direction of the Hall element 2 are not parallel to each other, but an offset angle θ is provided therebetween.

Figure 8:
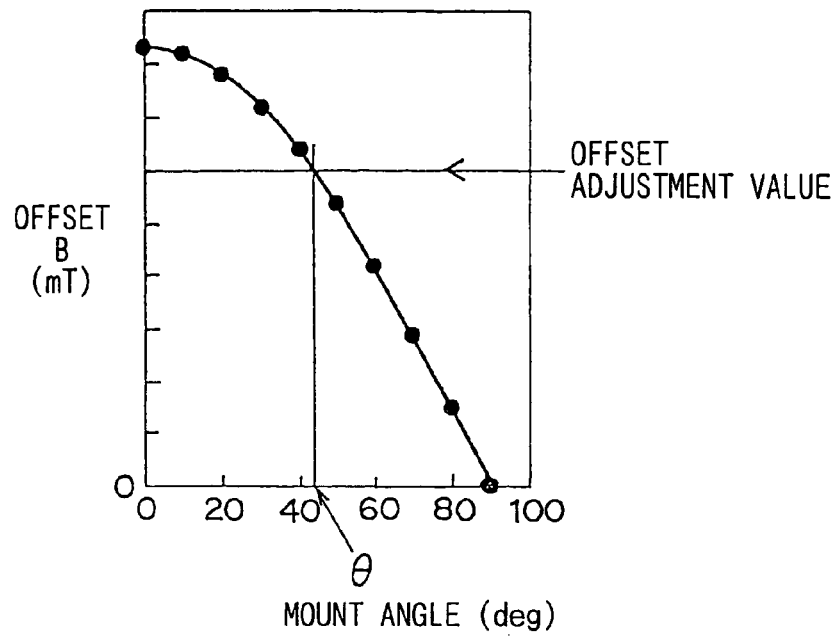
FIG. 8 is a graph showing the relationship between the mount angle of an auxiliary magnet and an offset magnetic flux in the rotational angle detecting device of the fifth embodiment.

Since the offset angle θ (the mount angle in FIG. 8) is provided between the magnetic flux direction from the auxiliary magnet 8 to the Hall element 2 and the magnetic detection direction of the Hall element 2, the magnetic flux density applied to the Hall element 2 by the auxiliary magnet 8 (the interpole magnetic flux density in FIG. 8) can be varied by adjusting the offset angle θ (the mount angle in FIG. 8). That is, the main magnet angle (reference angle) for the magnetic flux density of 0 can be adjusted by adjusting the offset angle θ.

[Sixth Embodiment]

Figure 9A:
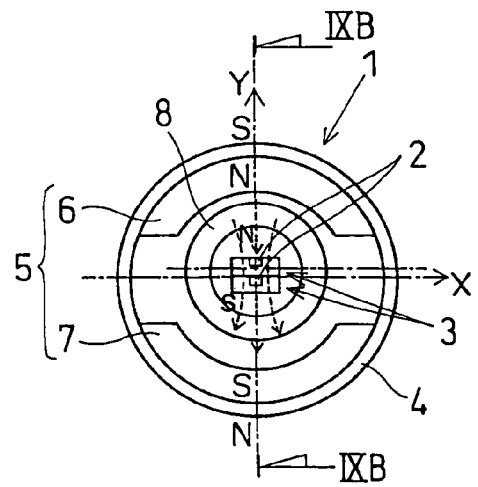
FIG. 9A is a diagram showing a rotational angle detecting device of a sixth embodiment when viewed along the Z-axis direction.
Figure 9B:
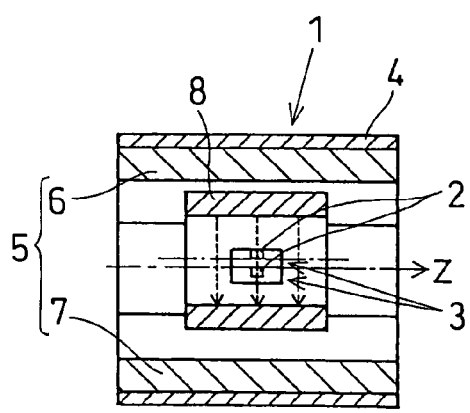
FIG. 9B is a cross-sectional view of the rotational angle detecting device of the sixth embodiment which is taken along the Z-axis direction (line IXB—IXB)

A sixth embodiment according to the present invention will be described with reference to FIGS. 9A to 9C and FIGS. 10A and 10B. FIG. 9A is a diagram showing a rotational angle detecting device when viewed in the Z-axis direction and FIG. 9B is a cross-sectional view of the rotational angle detecting device which is taken along the Z-axis direction.

In the first to fifth embodiments, one Hall IC 3 (Hall element 2) is used. However, in the sixth embodiment, two Hall ICs 3 (Hall elements 2) are used.

Figure 9C:
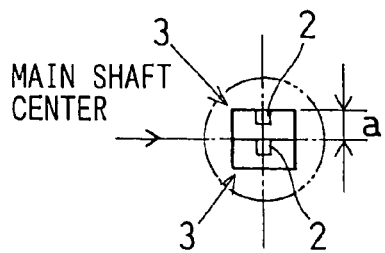
FIG. 9C is a diagram showing two Hall ICs which are viewed along the Z-axis direction.

When only one Hall IC 3 (Hall element 2) is provided like the first to fifth embodiments, the Hall element 2 is disposed at the rotational center. However, when two Hall ICs 3 (Hall elements 2) are provided like this embodiment, the Hall element 2 of one Hall IC 3 is disposed at the rotational center, and the other Hall IC 3 is disposed on the one Hall IC 3. With this construction, as shown in FIG. 9C, the Hall element 2 of the other Hall IC 3 is displaced from the rotational center by the amount corresponding to the thickness a of the Hall IC 3.

Figure 10A:
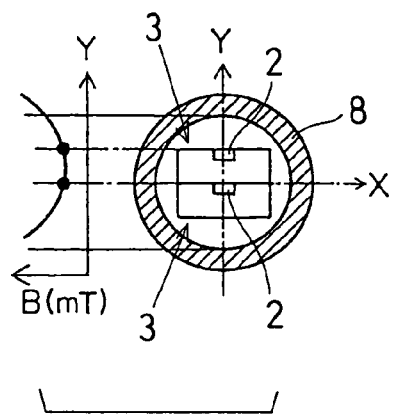
FIGS. 10A and 10B are graphs showing the relationship between the mount position of the Hall element in the Y-axis direction and the offset magnetic flux in the sixth embodiment.
Figure 10B:
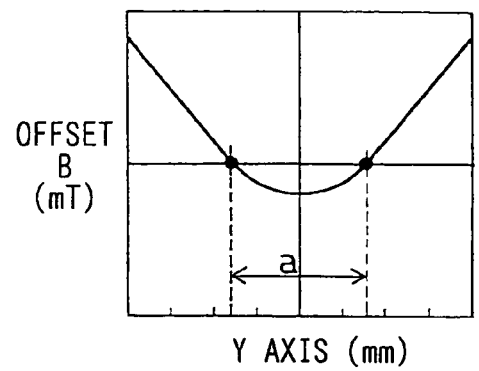

In such a case, the auxiliary magnet 8 is disposed so that the center of the cylinder of the auxiliary magnet 8 is located at the center of the two Hall elements 2 as shown in FIG. 10A, and the same amount of magnetic flux density is applied to each of the two Hall element 2. That is, as shown in FIG. 9A, the auxiliary magnet 8 is disposed so that the center of the cylinder of the auxiliary magnet 8 is displaced to the other Hall IC 3 side by the amount corresponding to a/2.

By disposing the auxiliary magnet 8, the main magnet angle (offset angle) for the magnetic flux density of 0 is equal between the two Hall elements 2 as shown in FIG. 9B. Accordingly, the same detection characteristic can be achieved from the two Hall ICs 3.

[Seventh Embodiment]

Figure 11A:
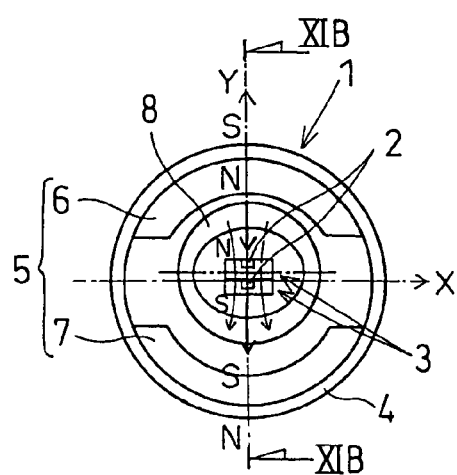
FIG. 11A is a diagram showing a rotational angle detecting device of a seventh embodiment when viewed along the Z-axis direction.
Figure 11B:
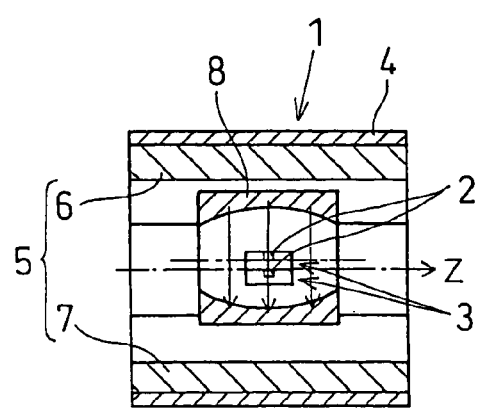
FIG. 11B is a cross-sectional view of the rotational angle detecting device of the seventh embodiment which is taken along the Z-axis direction (line XIB—XIB)
Figure 12A:
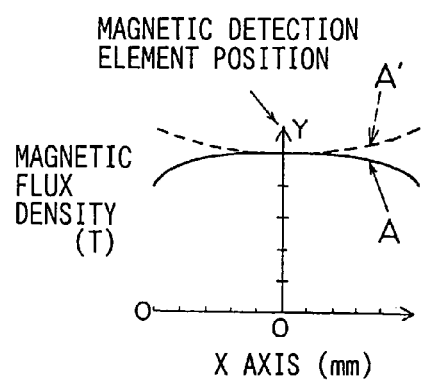
FIGS. 12A and 12B are graphs showing the relationship between the displacement amount of the Hall element and the offset magnetic flux in the seventh embodiment.
Figure 12B:
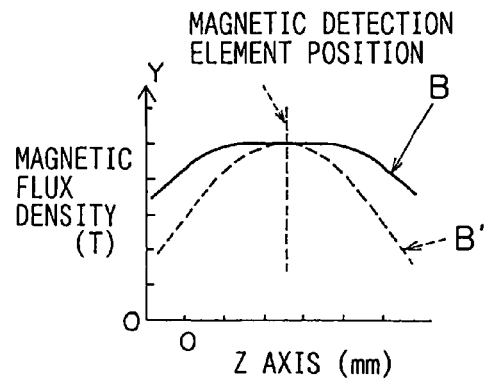

A seventh embodiment according to the present invention will be described with reference to FIGS. 11A and 11B and FIGS. 12A and 12B. FIG. 11A is a diagram showing a rotational angle detecting device when viewed in the Z-axis direction, and FIG. 11B is a cross-sectional view of the rotational angle detecting device which is taken along the Z-axis direction.

(First Feature of Seventh Embodiment)

In the first embodiment, when the mount position of the Hall element 2 is displaced in the X-axis direction with respect to the auxiliary magnet 8 as indicated by a solid line of FIG. 3A (see a broken line A' of FIG. 12A) in the first embodiment, the distance between the Hall element 2 and the auxiliary magnet 8 is reduced, and the magnetic flux density applied from the auxiliary magnet 8 to the Hall element 2 is increased, so that the offset amount is increased.

Therefore, according to this embodiment, in order to solve the above disadvantage, the thickness of the auxiliary magnet 8 when viewed in the Z-axis direction is set so as to be large in the Y-axis direction and small in the X-axis direction as shown in FIG. 11A. The variation of the thickness of the auxiliary magnet 8 is set on the basis of the variation range of the magnetic flux density passing through the Hall element 2 which varies in accordance with the displacement of the mount position of the Hall element 2 in the X-axis direction. That is, the variation of the thickness of the auxiliary magnet 8 is set so that the magnetic flux density applied from the auxiliary magnet 8 to the Hall element 2 is not varied even when the mount position of the Hall element 2 is displaced in the X-axis direction.

The rotational angle detecting device of this embodiment is equipped as described above. Accordingly, even when the mount position of the Hall element 2 is displaced in the X-axis direction with respect to the auxiliary magnet 8 due to a fabrication error or the like, increase of the magnetic flux density applied from the auxiliary magnet 8 to the Hall element 2 can be suppressed by the auxiliary magnet 8 which is reduced in thickness in the displacement direction. Specifically, as indicated by a solid line A of FIG. 12A, the magnetic flux density applied to the Hall element 2 by the auxiliary magnet 8 is not increased and thus kept constant even when the mount position of the Hall element 2 is displaced from the center in the X-axis direction.

That is, even when the mount position of the Hall element 2 is displaced in the X-axis direction due to the fabrication error of the rotational angle detecting device or the like, the variation of the magnetic flux density (offset magnetic flux) applied to the Hall element 2 by the auxiliary magnet 8 can be suppressed, and thus the reduction of the detection precision can be prevented.

(Second Feature of Seventh Embodiment)

In the first embodiment, the leak magnetic flux is magnified at both the end sides of the auxiliary magnet 8 having the cylindrical shape in the Z-axis direction as shown in FIG. 3C (see a broken line B' of FIG. 12B) in the first embodiment.

Therefore, according to this embodiment, in order to solve this disadvantage, as shown in FIG. 11B, the thickness of the auxiliary magnet 8 along the Z-axis direction is set so as to be reduced around the mount position of the Hall element 2 and increased as the position is farther away from the mount position of the Hall element 2. The variation of the thickness of the auxiliary magnet 8 is set on the basis of the variation range of the magnetic flux density passing through the Hall element 2 which is varied in accordance with the displacement of the mount position of the Hall element 2 in the Z-axis direction. That is, the variation of the thickness of the auxiliary magnet 8 is set so that the magnetic flux density applied to the Hall element 2 by the auxiliary magnet 8 is not varied even when the mount position of the Hall element 2 is displaced in the z-axis direction.

According to the rotational angle detecting device of this embodiment provided as described above, even when the mount position of the Hall element 2 is displaced in the Z-axis direction with respect to the auxiliary magnet 8, the reduction of the magnetic flux density applied from the auxiliary magnet 8 to the Hall element 2 can be prevented by the auxiliary magnet 8 which is increased in thickness in the displacement direction. Specifically, as indicated by a solid line B of FIG. 12B, even when the mount position of the Hall element 2 is displaced from the center in the Z-axis direction, the magnetic flux density applied from the auxiliary magnet 8 to the Hall element 2 is not reduced, and thus it is kept substantially constant.

That is, even when the mount position of the Hall element 2 is displaced in the Z-axis direction due to a fabrication error of the rotational angle detecting device or the like, the variation of the magnetic flux density (offset magnetic flux) applied to the Hall element 2 by the auxiliary magnet 8 can be suppressed, and thus the reduction of the detection precision can be prevented.

[Eighth Embodiment]

Figure 13A:
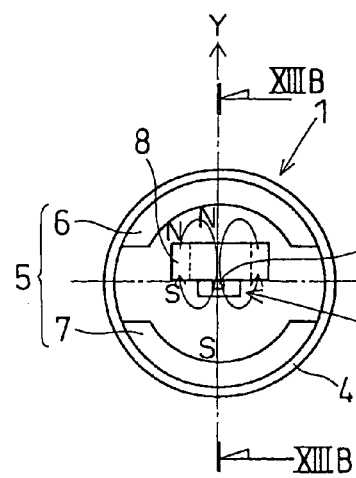
FIG. 13A is a diagram showing a rotational angle detecting device of an eighth embodiment when viewed along the Z-axis direction.
Figure 13B:
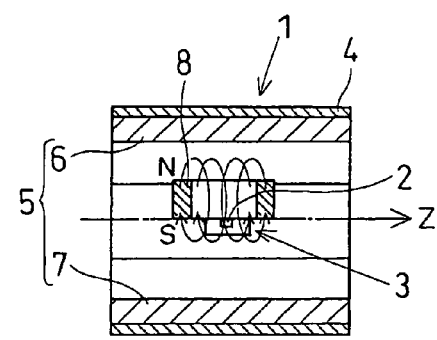
FIG. 13B is a cross-sectional view of the rotational angle detecting device of the eighth embodiment which is taken along the Z-axis direction (line XIIIB—XIIIB)

An eighth embodiment according to the present invention will be described with reference to FIGS. 13A and 13B and FIG. 14. FIG. 13A is a diagram showing a rotational angle detecting device when viewed in the Z-axis direction, and FIG. 13B is a cross-sectional view of the rotational angle detecting device which is taken along the Z-axis direction.

In the first to seventh embodiments, the auxiliary magnet 8 is disposed so as to surround the Hall IC 3 (Hall element 2) when viewed in the Z-axis direction. On the other hand, according to this embodiment, the auxiliary magnet 8 is dispose so as to surround the Hall IC 3 (Hall element 2) when viewed in the direction (the Y-axis direction in this embodiment) perpendicular to the Z-axis direction. The auxiliary magnet 8 of this embodiment is designed in a rectangular cylindrical shape as shown in FIG. 14.

The Hall IC 3 (Hall element 2) is surrounded by the auxiliary magnet 8 when viewed in the Y-axis direction, whereby the variation of the magnetic flux density (offset magnetic flux) applied from the auxiliary magnet 8 to the Hall element 2 can be suppressed even when the position of the Hall element 2 is displaced in the X-axis direction of the auxiliary magnet 8. Furthermore, even when the fabrication position of the Hall element 2 is displaced in the Z-axis direction of the auxiliary magnet 8, the variation of the magnetic flux density (offset magnetic flux) applied to the Hall element 2 by the auxiliary magnet 8 can be suppressed.

That is, by disposing the auxiliary magnet 8 so as to surround the Hall element 2 when viewed in the Y-axis direction, the variation of the magnetic flux density (offset magnetic flux) applied to the Hall element 2 by the auxiliary magnet 8 can be suppressed even when the Hall element 2 is displaced from the center of the auxiliary magnet 8 around the Y-axis (the two-dimensional direction of the X-axis and Y-axis).

Furthermore, in this embodiment, as shown in FIGS. 13A and 13B, the Hall element 2 is protruded from the end of the auxiliary magnet 8 in the cylinder direction. When the Hall element 2 is protruded from the end in the cylinder direction of the auxiliary magnet 8 as described above, there would be no problem if the magnetic force of the auxiliary magnet 8 has an effect on the Hall element 2.

[Ninth Embodiment]

A ninth embodiment according to the present invention will be described with reference to FIGS. 15A to 17C. FIG. 15A is a diagram showing a rotational angle detecting device when viewed in the Z-axis direction, and FIG. 15B is a cross-sectional view of the rotational angle detecting device which is taken along the Z-axis direction.

In the above embodiments, the Hall element 2 is surrounded by the auxiliary magnet 8 to suppress the effect of the displacement of the Hall element 2. On the other hand, according to the ninth embodiment, the auxiliary magnet 8 is disposed at both the Hall element 2 when viewed in the Z-axis direction or when viewed in the direction perpendicular to the Z-axis direction. Specifically, the Hall element 2 is disposed at the center between two planar auxiliary magnets 8 disposed in parallel.

Figure 16A:
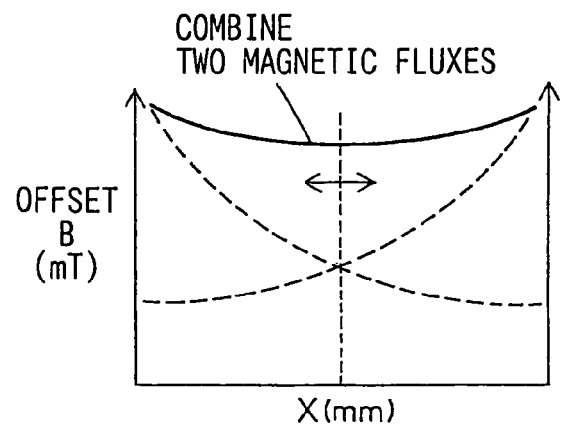
FIGS. 16A to 16C are graphs showing the relationship between the displacement amount of the Hall element and the offset magnetic flux in the ninth embodiment.

In the ninth embodiment, the auxiliary magnets 8 are disposed at both the sides in the X-axis direction of the Hall element 2 when viewed in the Z-axis direction. This arrangement induces composite magnetic force based on the two auxiliary magnets 8 between the two auxiliary magnet 8 as shown in FIG. 16A. Therefore, even when the position of the Hall element 2 is displaced in the X-axis direction of the auxiliary magnets 8 (in the direction along which the Hall element 2 is sandwiched by the auxiliary magnets 8), the main magnet angle (reference angle) for the magnetic flux density of 0 can be prevented from being displaced, and thus the reduction of the detection precision can be prevented.

Figure 16B:
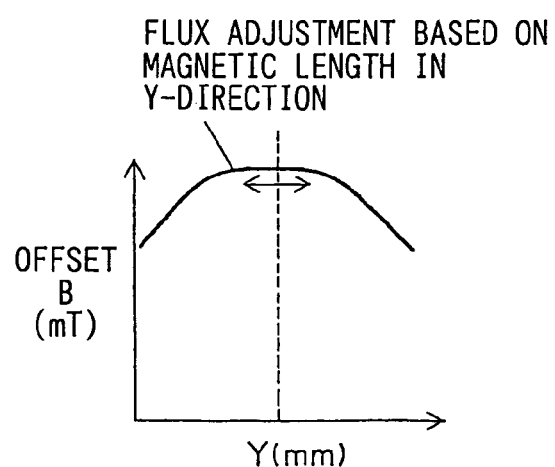
Figure 17A:
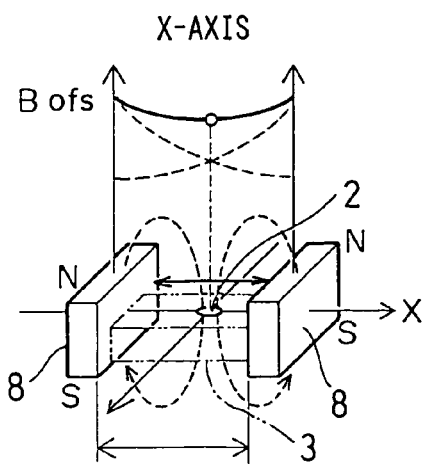
FIGS. 17A to 17C are perspective views and graphs showing the relationship between the displacement amount of the Hall element and the offset magnetic flux in the ninth embodiment.
Figure 17B:
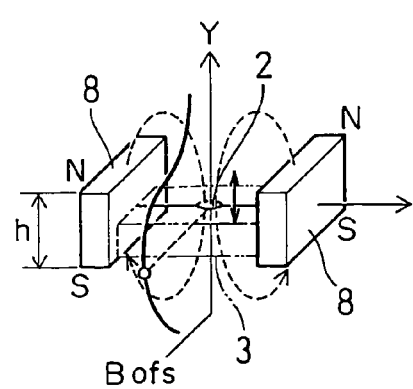

On the other hand, the leak magnetic flux is magnified at both the end sides in the Y-axis direction of the two auxiliary magnets 8. Therefore, by increasing the dimension (plate length h) in the Y-axis direction of the auxiliary magnets 8 as shown in FIG. 17B, the Y-axis area having no effect on the leak magnetic flux can be set to be longer as shown in FIG. 16B. Therefore, even when the Hall element 2 is displaced from the center of the auxiliary magnets 8 in the Y-axis direction, the main magnet angle (reference angle) for the magnetic flux density of 0 can be prevented from being displaced by adjusting the dimension (plate length h) in the Y-axis direction of the auxiliary magnets 8, thereby preventing the reduction of the detection precision.

In this embodiment, the dimension (plate length h) in the Y-axis direction of the auxiliary magnets 8 is increased. However, the thickness of the auxiliary magnets 8 may be set so as to be reduced around the mount position of the Hall element 2 and increased as the position is farther away from the mount position of the Hall element 2 in the Y-axis direction, so that the magnetic flux density applied to the Hall element 2 by the auxiliary magnets 8 is not varied even when the mount position of the Hall element 2 is displaced in the Y-axis direction.

Figure 16C:
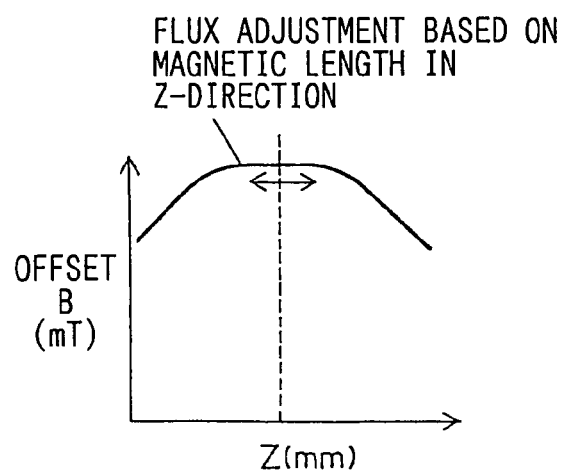
Figure 17C:
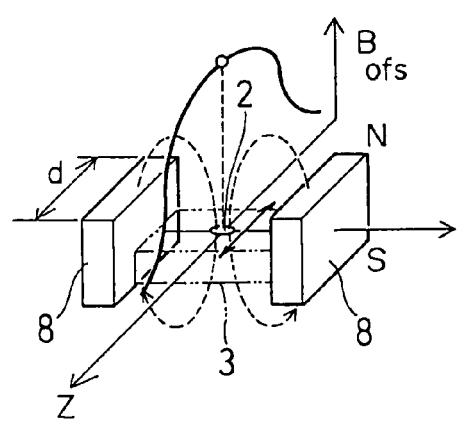

Likewise, the leak magnetic flux is magnified at both the end sides in the Z-axis direction of each of the two auxiliary magnets 8. Therefore, by increasing the dimension (plate length d) in the Z-axis direction of the auxiliary magnets 8 as shown in FIG. 17C, the long Z-axis area having no effect of the leak magnetic flux can be achieved as shown in FIG. 16C. Therefore, the main magnetic angle (reference angle) for the magnetic flux density of 0 can be prevented from being displaced by adjusting the dimension (plate length d) in the Z-axis direction of the auxiliary magnets 8 even when the Hall element 2 is displaced from the center of the auxiliary magnets 8 in the Z-axis direction, so that the reduction of the detection precision can be prevented.

In this embodiment, the dimension (plate length d) is in the Z-axis direction of the auxiliary magnets 8. However, the thickness of the auxiliary magnets 8 may be set so as to be reduced around the mount position of the Hall element 2 and increased as the position is farther away from the mount position of the Hall element 2 in the Z-axis direction, so that the magnetic flux density applied to the Hall element 2 by the auxiliary magnets 8 is not varied even when the mount position of the Hall element 2 is displaced in the Z-axis direction.

[Tenth Embodiment]

Figure 18A:
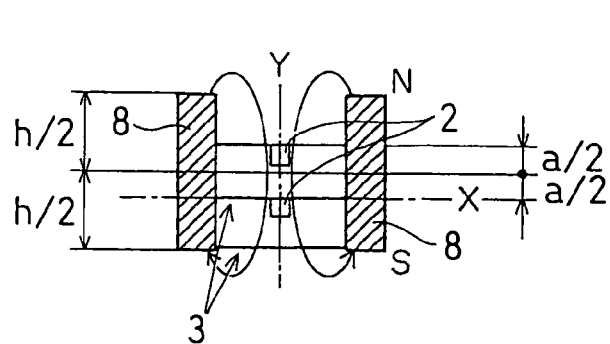
FIG. 18A is a diagram showing the Hall element and the auxiliary magnet in a tenth embodiment which are viewed along the Z-axis direction.

A tenth embodiment according to the present invention will be described with reference to FIGS. 18A and 18B. FIG. 18A is a diagram showing the Hall ICs 3 and the auxiliary magnet 8 which are viewed in the Z-axis direction, and FIG. 18B is a cross-sectional view of the Hall ICs 3 and the auxiliary magnet 8 which is taken along the Z-axis direction.

The tenth embodiment uses two Hall ICs 3 (Hall elements 2) like the sixth embodiment.

When one Hall IC 3 (Hall element 2) is provided like the ninth embodiment, the Hall element 2 is mounted at the rotational center. On the other hand, when the two Hall ICs 3 (Hall elements 2) are disposed like this embodiment, the Hall element 2 of one Hall IC 3 is mounted at the rotational center, and the other Hall IC 3 is mounted on the one Hall IC 3. Accordingly, the Hall element 2 of the other Hall IC 3 is displaced from the rotational center by the amount corresponding to the thickness of the Hall IC 3.

Figure 18B:
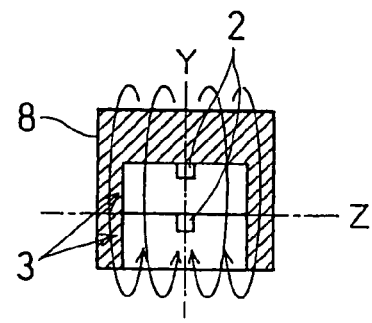
FIG. 18B is a cross-sectional view taken along the Z-axis direction.

In such a case, as shown in FIGS. 18A and 18B, the auxiliary magnet 8 is disposed so that the plate center thereof is located at the center of the two Hall elements 2 so that the same amount of magnetic flux density is applied to the two Hall elements 2. Accordingly, the main magnet angle (offset angle) at which the magnetic flux density is equal to zero is equal between the two Hall elements 2, and the same detection characteristic can be achieved from the two Hall ICs 3.

[Eleventh Embodiment]

Figure 19A:
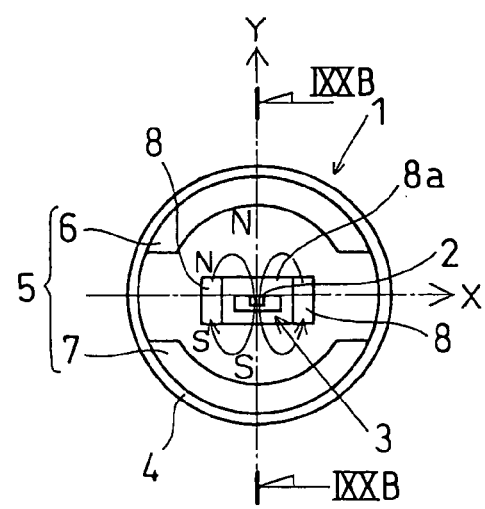
FIG. 19A is a diagram showing a rotational angle detecting device of an eleventh embodiment when viewed along the Z-axis direction.
Figure 19B:
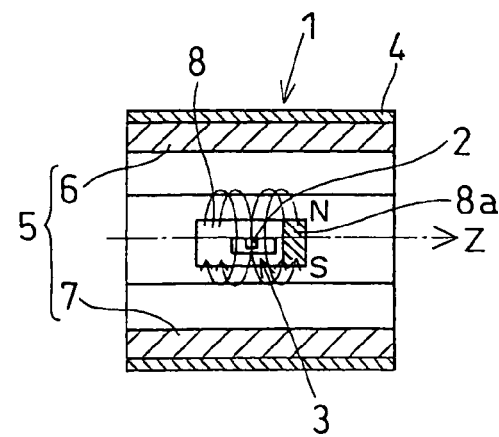
FIG. 19B is a cross-sectional view of the rotational angle detecting device of the eleventh embodiment which is taken along the Z-axis direction (line IXXB—IXXB)
Figure 20:
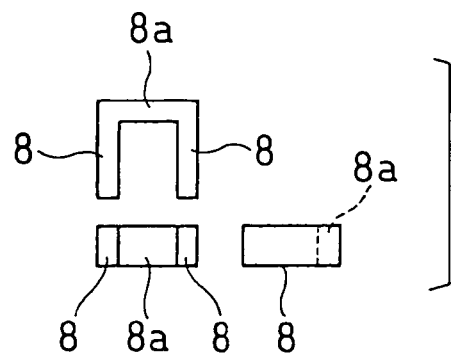
FIG. 20 is a cross-sectional view of the auxiliary magnet in the eleventh embodiment.

An eleventh embodiment according to the present invention will be described with reference to FIGS. 19A and 19B and FIG. 20. FIG. 19A is a diagram showing a rotational angle detecting device when viewed from the Z-axis direction, and FIG. 19B is a cross-sectional view of the rotational angle detecting device which is taken along the Z-axis direction.

The tenth embodiment described above uses the two planar auxiliary magnets 8. In the eleventh embodiment, as shown in FIG. 20, the auxiliary magnet 8 is designed to have a U-shaped section as if the two auxiliary magnets 8 sandwiching the Hall element 2 from both the sides thereof are designed into one part. That is, the auxiliary magnets 8 disposed at both the sides of the Hall element 2 and a link member 8a for connecting the auxiliary magnets 8 are integrally equipped. This construction further enhances the fabrication performance.

[Twelfth Embodiment]

Figure 21A:
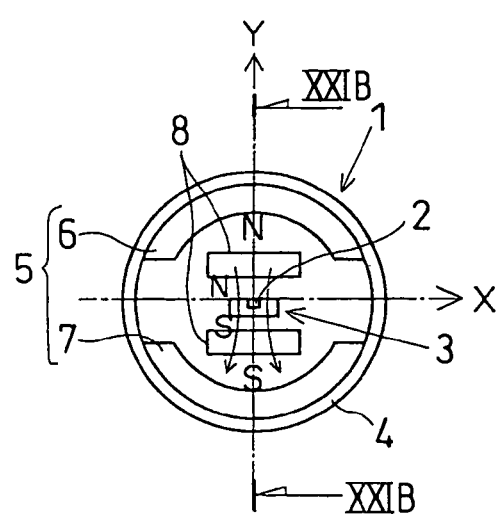
FIG. 21A is a diagram showing a rotational angle detecting device of a twelfth embodiment when viewed along the Z-axis direction.
Figure 21B:
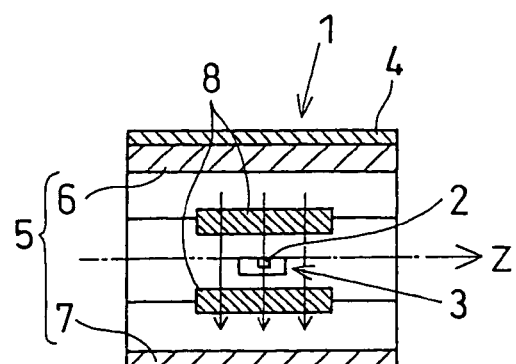
FIG. 21B is a cross-sectional view of the rotational angle detecting device of the twelfth embodiment which is taken along the Z-axis direction (line XXIB—XXIB)

A twelfth embodiment according to the present invention will be described with reference to FIGS. 21A and 21B. FIG. 21A is a diagram showing a rotational angle detecting device when viewed in the Z-axis direction, and FIG. 21B is a cross-sectional view of the rotational angle detecting device which is taken along the Z-axis direction.

In the ninth to eleventh embodiments, the auxiliary magnet 8 is disposed at both the sides of the Hall element 2 in the X-axis direction when viewed in the Z-axis direction.

On the other hand, according to this embodiment, the auxiliary magnet 8 is disposed at both the sides of the Hall element 2 in the Y-axis direction when viewed in the Z-axis direction. With this arrangement, the main magnet angle (reference angle) for the magnetic flux density of 0 can be prevented from being displaced even when the position of the Hall element 2 is displaced in the Y-axis direction of the auxiliary magnet 8 (the direction along which the Hall element 2 is sandwiched by the auxiliary magnets 8).

[Thirteenth Embodiment]

Figure 22A:
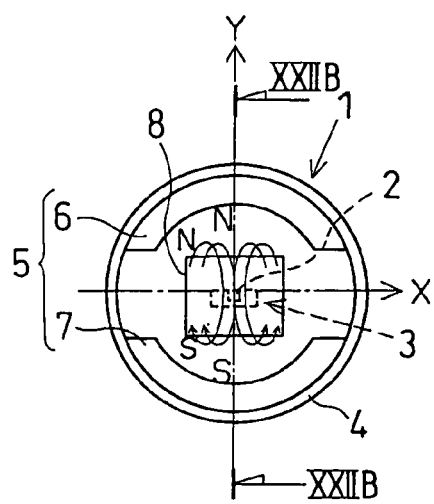
FIG. 22A is a diagram showing a rotational angle detecting device of a thirteenth embodiment when viewed along the Z-axis direction.
Figure 22B:
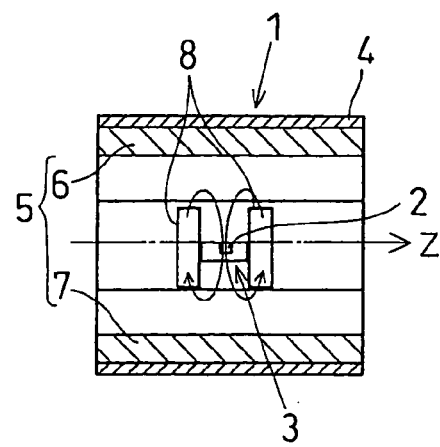
FIG. 22B is a cross-sectional view of the rotational angle detecting device of the thirteenth embodiment which is taken along the Z-axis direction (line XXIIB—XXIIB)

A thirteenth embodiment according to the present invention will be described with reference to FIGS. 22A and 22B. FIG. 22A is a diagram showing a rotational angle detecting device when viewed in the Z-axis direction, and FIG. 22B is a cross-sectional view of the rotational angle detecting device which is taken along the Z-axis direction.

In the thirteenth embodiment, the auxiliary magnets 8 are disposed at both the sides of the Hall element 2 in the Z-axis direction when viewed in the direction perpendicular to the Z-axis (the X-axis direction in this embodiment). With this arrangement, the main magnet angle (reference angle) for the magnetic flux density of 0 can be prevented from being displaced even when the position of the Hall element 2 is displaced in the Z-axis direction of the auxiliary magnet 8 (the direction along which the Hall element 2 is sandwiched by the auxiliary magnets 8).

[Fourteenth Embodiment]

Figure 23A:
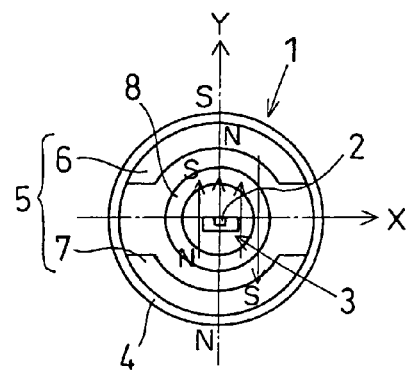
FIG. 23A is a diagram showing a rotational angle detecting device of a fourteenth embodiment when viewed along the Z-axis direction.
Figure 23B:
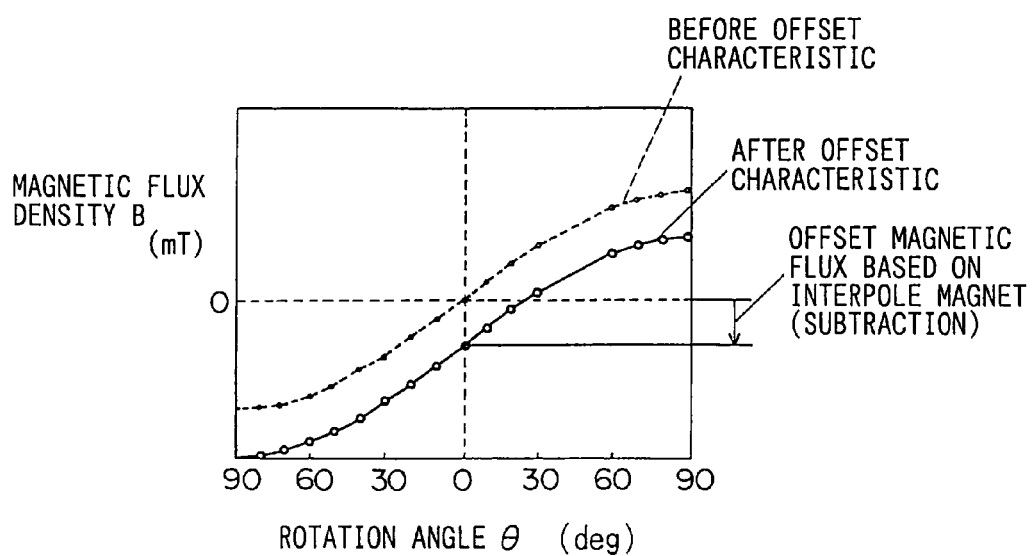
FIG. 23B is a cross-sectional view of the rotational angle detecting device of the fourteenth embodiment which is taken along the Z-axis direction.

A fourteenth embodiment according to the present invention will be described with reference to FIGS. 23A–23B. FIG. 23A is a diagram showing a rotational angle detecting device when viewed from the Z-axis direction.

In the first to thirteenth embodiments, the auxiliary magnet 8 is used to increase the magnetic flux density to be applied to the Hall element 2. On the other hand, in this embodiment, as shown in FIG. 23A, the auxiliary magnet 8 is used to reduce the magnetic flux density to be applied to the Hall element 2. With this construction, as shown in FIG. 23B, the main magnet angle for the magnetic flux density of 0 can be offset to the minus side by the auxiliary magnet 8.

[Fifth Embodiment]

Figure 24A:
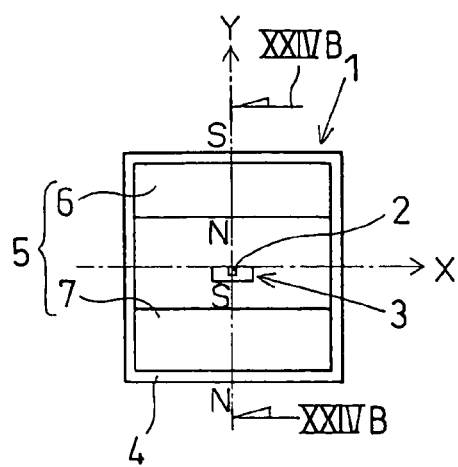
FIG. 24A is a diagram showing a rotational angle detecting device of a fifteenth embodiment when viewed along the Z-axis direction.
Figure 24B:
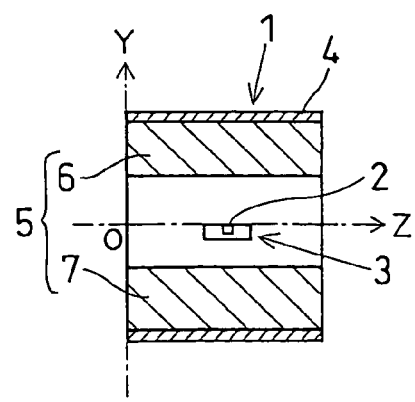
FIG. 24B is a cross-sectional view of the rotational angle detecting device of the fifteenth embodiment which is taken along the Z-axis direction (line XXIVB—XXIVB)

A fifth embodiment according to the present invention will be described with reference to FIGS. 24a and 24B. FIG. 24A is a diagram showing a rotational angle detecting device when viewed in the Z-axis direction, and FIG. 24B is a cross-sectional view of the rotational angle detecting device which is taken along the Z-axis direction. This embodiment shows a modification of the rotor 1, and thus the auxiliary magnet 8 is omitted from the illustration of FIGS. 24A–24B.

In the rotors 1 of the first to fourteenth embodiments, each of the magnetic flux applying magnet 6 and the magnetic flux suction magnet 7 is designed in a semi-cylindrical shape. On the other hand, in the rotor 1 of the fifteenth embodiment, the magnetic flux applying magnet 6 and the magnetic flux suction magnet 7 which are designed to be planar when viewed in the z-axis direction are disposed in parallel to each other.

The thickness of at least one of the magnetic flux applying magnet 6 and the magnetic flux suction magnet 7 may be varied so that the magnetic flux density applied to the Hall element 2 by the main magnet 5 is not varied even when the mount position of the Hall element 2 is displaced.

[Sixteenth Embodiment]

Figure 25A:
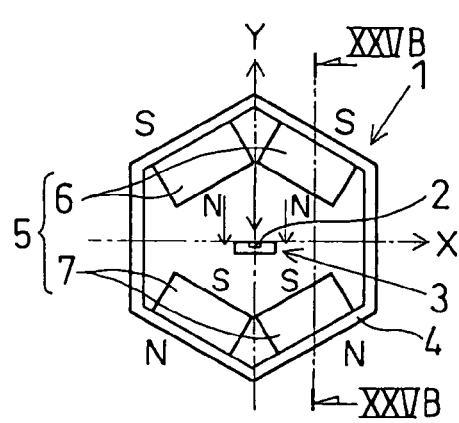
FIG. 25A is a diagram showing a rotational angle detecting device of a sixteenth embodiment when viewed along the Z-axis direction.
Figure 25B:
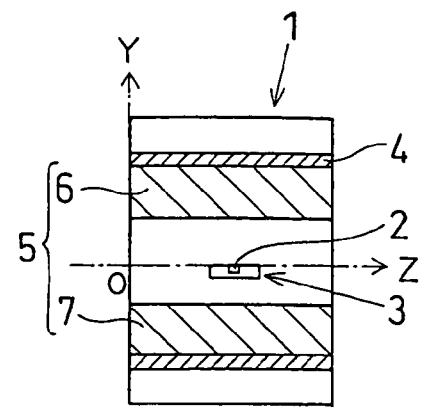
FIG. 25B is a cross-sectional view of the rotational angle detecting device of the sixteenth embodiment which is taken along the Z-axis direction (line XXVB—XXVB)

A sixteenth embodiment according to the present invention will be described with reference to FIGS. 25A and 25B. FIG. 25A is a diagram showing a rotational angle detecting device when viewed in the z-axis direction, and FIG. 25B is a cross-sectional view of the rotational angle detecting device which is taken along the Z-axis direction. This embodiment shows a modification of the rotor 1, and thus the auxiliary magnet 8 is omitted from the illustration of FIGS. 25A and 25B.

In the rotors 1 of the first to fifteenth embodiments, each of the magnetic flux applying magnet 6 and the magnetic flux suction magnet 7 is formed of one magnet. On the other hand, in the rotor 1 of the sixteenth embodiment, each of the magnetic flux applying magnet 6 and the magnetic flux suction magnet 7 is formed of plural (every two magnets in this embodiment) magnets.

The thickness of at least one of the magnetic flux applying magnet 6 and the magnetic flux suction magnet 7 may be varied so that the magnetic flux density applied to the Hall element 2 by the main magnet 5 is not varied even when the mount position of the Hall element 2 is displaced.

[Seventeenth Embodiment]

Figure 26A:
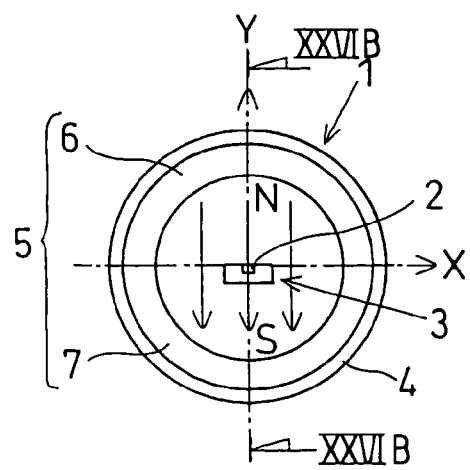
FIG. 26A is a diagram showing a rotational angle detecting device of a seventeenth embodiment when viewed along the Z-axis direction.
Figure 26B:
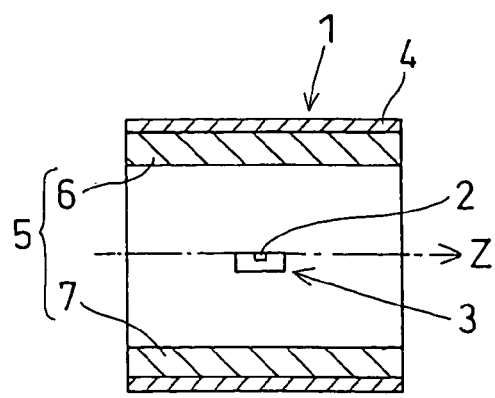
FIG. 26B is a cross-sectional view of the rotational angle detecting device of the seventeenth embodiment which is taken along the Z-axis direction (line XXVIB—XXVIB)
Figure 27A:
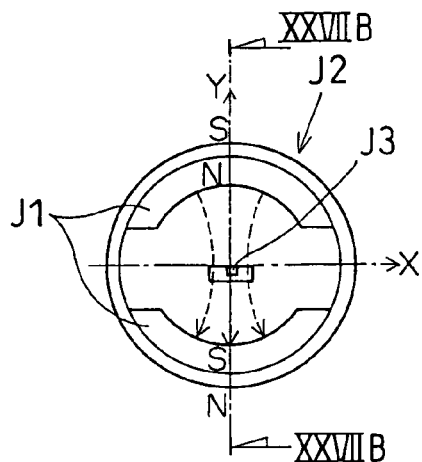
FIG. 27A is a diagram showing a related art rotational angle detecting device when viewed along the Z-axis direction.
Figure 27B:
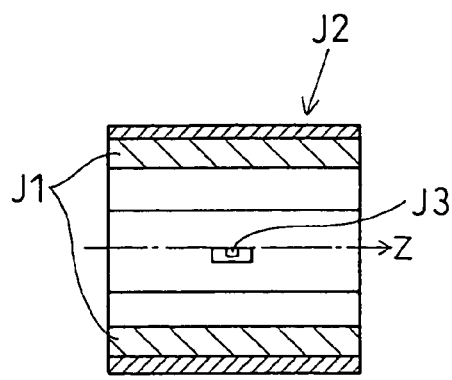
FIG. 27B is a cross-sectional view of the rotational angle detecting device of the related art embodiment which is taken along the Z-axis direction (line XXVIIB—XXVIIB)
Figure 28A:
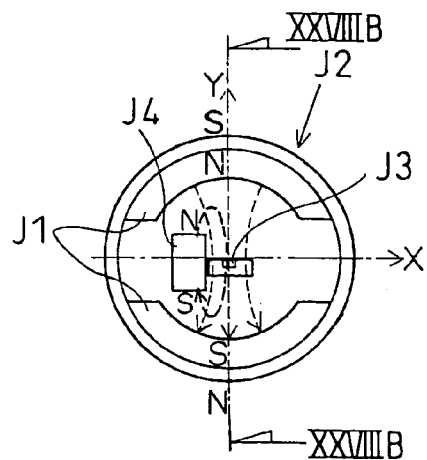
FIG. 28A is a diagram showing a related art rotational angle detecting device when viewed along the Z-axis direction.
Figure 28B:
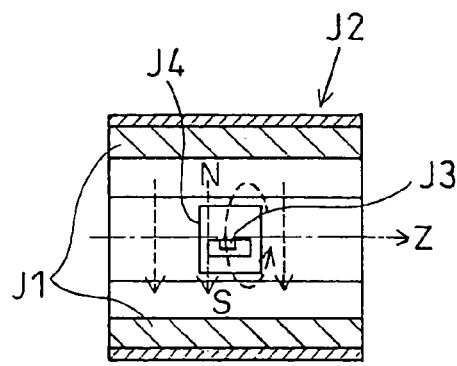
FIG. 28B is a cross-sectional view of the rotational angle detecting device which is taken along the Z-axis direction (line XXVIIIB—XXVIIIB)
Figure 29:
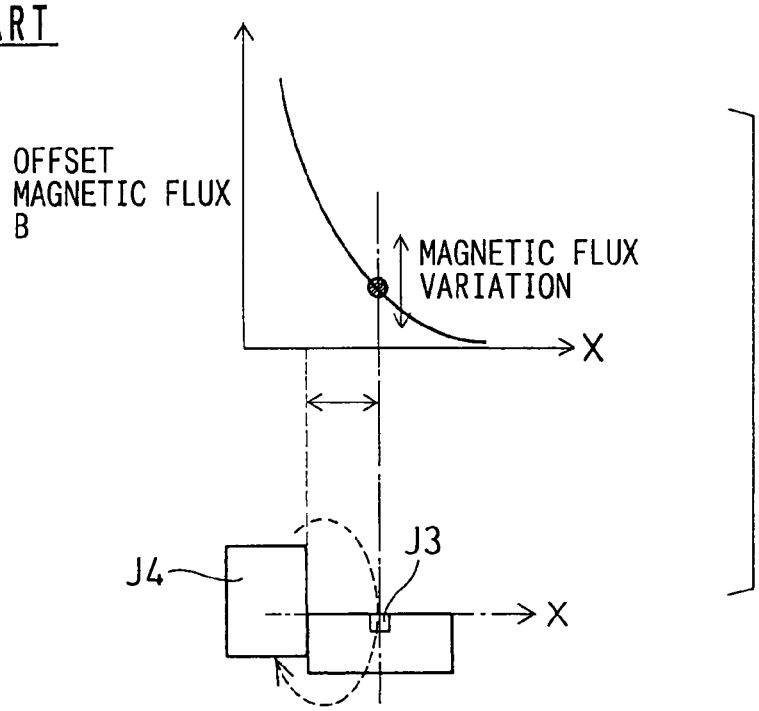
FIG. 29 is a graph showing the relationship between the displacement amount of the Hall element and the offset magnetic flux in the related art.

A seventeenth embodiment according to the present invention will be described with reference to FIGS. 26A and 26B. FIG. 26A is a diagram showing a rotational angle detecting device which is viewed in the Z-axis direction, and FIG. 26B is a cross-sectional of the rotational angle detecting device which is taken along the Z-axis direction. This embodiment shows a modification of the rotor 1, and thus the auxiliary magnet 8 is omitted from the illustration of FIGS. 26A and 26B.

In the rotors 1 of the first to sixteenth embodiments, each of the magnetic flux applying magnet 6 and the magnetic flux suction magnet 7 is formed of an individual separate magnet. On the other hand, in the rotor 1 of the seventeenth embodiment, the magnetic flux applying magnet 6 and the magnetic flux suction magnet 7 are formed of a single magnet.

Even when the magnetic flux applying magnet 6 and the magnetic flux suction magnet 7 are formed of a single magnet like this embodiment, the thickness of at least one of the magnetic flux applying magnet 6 and the magnetic flux suction magnet 7 may be varied so that the magnetic flux density applied to the Hall element 2 by the main magnet 5 is not varied even when the mount position of the Hall element 2 is displaced.

[Modifications]

In the above embodiments, the fixing member is fixed, and the rotor 1 is rotated. However, the structure of the above embodiments may be modified so that a member corresponding to the rotor 1 is fixed, and a member for supporting the magnetic detection element (the Hall IC 3 containing the Hall element 2 in this embodiment) is rotated. In other words, the magnetic detection element may be rotated while the main magnet 5 is fixed, thereby detecting the rotational angle from the output of the magnetic detection element.

In the above embodiments, the Hall IC 3 containing the Hall element 2 is used. Only the Hall element 2 may be disposed in the main magnet 5 (the magnetic flux applying magnet 6 and the magnetic flux suction magnet 7) while the signal processing circuit is disposed at the outside of the main magnet 5. That is, the signal processing circuit of the Hall element 2 may be disposed in a controller separate from the rotational angle detecting device.

The embodiments are applied to a case where the opening degree of the throttle valve is detected by the rotational angle detecting device. However, they may be applied to detect the rotational angle of an arm portion of an industrial robot or the like, other rotational angles, etc.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A rotational angle detecting device having a magnetic detection element and a main magnet for applying magnetic force to the magnetic detection element, wherein variation of a relative rotational angle between the magnetic detection element and the main magnet is detected on the basis of magnetic force applied to the magnetic detection element, comprising:
   an auxiliary magnet disposed in a neighborhood of the magnetic detection element so that the relative rotational angle thereof to the magnetic detection element is not varied at anytime and constant magnetic force is applied to the magnetic detection element in the magnetic detection direction, wherein the auxiliary magnet is disposed so as to substantially surround the magnetic detection element.

2. The rotational angle detecting device according to claim 1, wherein a magnetic flux direction along which the auxiliary magnet applies magnetic flux to the magnetic detection element and a magnetic detection direction of the magnetic detection element are non-parallel to each other, and have an offset angle therebetween.

3. The rotational angle detecting device according to claim 1, wherein the main magnet and the auxiliary magnet are formed of permanent magnets having a same temperature characteristic.

4. The rotational angle detecting device according to claim 1, wherein the main magnet comprises a magnetic flux applying magnet part and a magnetic flux attraction magnet part.

5. The rotational angle detecting device according to claim 1, wherein the auxiliary magnet is a substantially cylindrical shape so as to continuously surround the magnetic detection element.

6. The rotational angle detecting device according to claim 5, wherein the auxiliary magnet is a cylindrical shape having a rectangular cross-section.

7. The rotational angle detecting device according to claim 5, wherein the auxiliary magnet is a cylindrical shape having a circular cross-section.

8. The rotational angle detecting device according to claim 1, wherein the auxiliary magnet includes flat, planar wall sections.

9. The rotational angle detecting device according to claim 1, wherein the auxiliary magnet has a substantially uniform thickness.

10. The rotational angle detecting device according to claim 1, wherein the auxiliary magnet is disposed to extend continuously around the detecting element.

11. The rotational angle detecting device according to claim 1, wherein said auxiliary magnet comprises two semi-cylindrical auxiliary magnets combined with each other.

12. The rotational angle detecting device according to claim 1, wherein the main magnet is disposed to at least partly surround the auxiliary magnet.

13. A rotational angle detecting device having a magnetic detection element and a main magnet for applying magnetic force to the magnetic detection element, wherein variation of the relative rotational angle between the magnetic detection element and the main magnet is detected on the basis of magnetic force applied to the magnetic detection element, comprising: an auxiliary magnet disposed in the neighborhood of the magnetic detection element so that the relative rotational angle thereof to the magnetic detection element is not varied at anytime and constant magnetic force is applied to the magnetic detection element in the magnetic detection direction, wherein the auxiliary magnet is disposed at least at both the sides of the magnetic detection element.

14. The rotational angle detecting device according to claim 13, wherein a magnetic flux direction along which the auxiliary magnet applies magnetic flux to the magnetic detection element and a magnetic detection direction of the magnetic detection element are non-parallel to each other, and have an offset angle therebetween.

15. The rotational angle detecting device according to claim 13, wherein the main magnet and the auxiliary magnet are formed of permanent magnets having a same temperature characteristic.

16. The rotational angle detecting device according to claim 13, wherein the auxiliary magnet is disposed solely at the sides of the magnetic detection element.

* * * * *